United States Patent
Cheng et al.

(10) Patent No.: US 10,484,517 B2
(45) Date of Patent: Nov. 19, 2019

(54) QUALITY OF SERVICE SUPPORT FOR LAYER 2 BASED DEVICE-TO-DEVICE RELAY

(71) Applicant: QUALCOMM Incorporated, San Diego, CA (US)

(72) Inventors: Hong Cheng, Bridgewater, NJ (US); Sudhir Kumar Baghel, Hillsborough, NJ (US); Zhibin Wu, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/724,848

(22) Filed: Oct. 4, 2017

(65) Prior Publication Data
US 2018/0234524 A1 Aug. 16, 2018

Related U.S. Application Data

(60) Provisional application No. 62/457,783, filed on Feb. 10, 2017.

(51) Int. Cl.
*H04L 29/06* (2006.01)
*H04B 7/15* (2006.01)
(Continued)

(52) U.S. Cl.
CPC .............. *H04L 69/22* (2013.01); *H04B 7/15* (2013.01); *H04L 41/0803* (2013.01); *H04L 41/5003* (2013.01); *H04L 69/324* (2013.01)

(58) Field of Classification Search
CPC ... H04B 7/15; H04B 7/15528; H04L 41/0803; H04L 41/5003; H04L 69/324;
(Continued)

(56) References Cited

U.S. PATENT DOCUMENTS

2012/0082084 A1* 4/2012 Balakrishnan .... H04W 72/1215 370/315
2012/0092994 A1* 4/2012 Wang ................... H04L 45/302 370/235
(Continued)

FOREIGN PATENT DOCUMENTS

| EP | 2627113 A1 | 8/2013 |
|---|---|---|
| WO | WO-2011040793 A2 | 4/2011 |
| WO | WO-2017018689 A1 | 2/2017 |

OTHER PUBLICATIONS

Fujitsu: "Multiplexing for Un Interface", 3GPP Draft; R2-101454, 3rd Generation Partnership Project (3GPP), Mobile Competence Centre; 650, Route Des Lucioles; F-06921, Sophia-Antipolis Cedex; France, vol. RAN WG2, No. San Francisco, USA, Feb. 16, 2010 (Feb. 16, 2010), XP050421827, pp. 4.
International Search Report and Written Opinion—PCT/US2018/012981—ISA/EPO—dated Jun. 11, 2019.

*Primary Examiner* — Brian D Nguyen
(74) *Attorney, Agent, or Firm* — Holland & Hart LLP

(57) ABSTRACT

Methods, systems, and devices for wireless communication are described. A transmitting device may be communicating via a relay wireless communication link. The communicating may include communications using a plurality of bearers. The transmitting device may identify a packet for transmission on the relay wireless communication link belonging to a first bearer. The first bearer may have an associated quality of service (QoS) parameter set. The transmitting device may configured a header of the packet that is processed by a relay wireless device to convey an indication of the QoS parameter set. The transmitting device may transmit the packet including the configured header on the relay wireless communication link and according to the QoS parameter set.

28 Claims, 16 Drawing Sheets

(51) Int. Cl.
*H04L 12/24* (2006.01)
*H04L 29/08* (2006.01)

(58) Field of Classification Search
CPC ............... H04L 69/22; H04W 84/047; H04W 72/1263; H04W 28/02
See application file for complete search history.

(56) References Cited

U.S. PATENT DOCUMENTS

| | | | |
|---|---|---|---|
| 2012/0120831 A1* | 5/2012 | Gonsa | H04W 76/15 370/252 |
| 2012/0147805 A1* | 6/2012 | Kim | H04B 7/155 370/312 |
| 2013/0039185 A1* | 2/2013 | Teyeb | H04B 7/155 370/235 |
| 2013/0077557 A1* | 3/2013 | Chen | H04B 7/15 370/315 |
| 2013/0114408 A1 | 5/2013 | Sastry et al. | |
| 2013/0143574 A1* | 6/2013 | Teyeb | H04W 36/0011 455/438 |
| 2013/0336199 A1* | 12/2013 | Schwartz | H04B 7/15507 370/315 |
| 2017/0013497 A1* | 1/2017 | Lee | H04L 67/12 |
| 2017/0041752 A1* | 2/2017 | Baek | H04W 4/023 |
| 2017/0230958 A1* | 8/2017 | Lee | H04W 76/14 |
| 2018/0054237 A1* | 2/2018 | Tseng | H04W 72/085 |
| 2018/0255499 A1* | 9/2018 | Loehr | H04B 7/2606 |

\* cited by examiner

Uu Radio Interface

PC5 Radio Interface

QUALITY OF SERVICE SUPPORT FOR LAYER 2 BASED DEVICE-TO-DEVICE RELAY

CROSS REFERENCES

The present Application for Patent claims priority to U.S. Provisional Patent Application No. 62/457,783 by Cheng, et al., entitled "Quality of Service Support For Layer 2 Based Device-To-Device Relay," filed Feb. 10, 2017, assigned to the assignee hereof, and which is hereby expressly incorporated by reference herein in its entirety.

INTRODUCTION

The following relates generally to wireless communication, and more specifically to quality of service (QoS) support for layer 2 (L2) based device-to-device (D2D) relay.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communication system may include a number of base stations or access network nodes, each simultaneously supporting communication for multiple communication devices, which may be otherwise known as user equipment (UE). In some cases, UEs may communicate directly with other UEs using communication protocols associated with proximity-based service (ProSe) communications, D2D communications, and the like.

A UE (e.g., a remote UE) may move out of coverage area of a base station and, instead, rely on a relay link with a neighboring UE (e.g., a relay UE) to continue communicating with the network. Alternatively, the remote UE may try to use the relay link for other considerations, e.g. uplink transmission power limitation, etc. Generally, the remote UE may discover the existence of the neighboring UE using a ProSe discovery process and select the neighboring UE as a relay UE. The remote UE may establish a relay link with the relay UE in order for the traffic from the remote UE to be forwarded to the network, and so that traffic from the network can be relayed to the remote UE. In some cases, the relay UE may support relay links with more than one remote UE.

In such a relay environment, the remote UE may have its own S1 interface, e.g., the control plane S1 mobility management entity (S1-MME) and/or S1 user plane (S1-U) that is different from the S1 interface of the relay UE. In some aspects, e.g., a 5G wireless communication system, the S1-MME may correspond to an N2 interface and S1-U may correspond to an N3 interface. For example, non-access stratum (NAS) signaling between the remote UE and mobility management entity (MME) may be exchanged without processing by the relay UE. As another example, the remote UEs data may be sent to the base station using a sidelink user-plane and an Uu (uplink) user-plane. Moreover, different bearers may be established for the remote UE than those that are established for the relay UE, however the relay UE may only support a limited number of bearers with the base station. With multiple remote UEs, this may result in different UE bearers (of remote UEs and/or relay UE) being multiplexed together during a transmission. Each bearer, however, may have its own associated QoS requirements, priority level, and the like. Current protocols, however, do not support differentiation of these bearers over the relay UE's Uu radio interface link between the relay UE and the base station or over the PC5 radio interface link between the relay UE and the remote UE. Conventional protocols also may not support different priority levels between bearers, e.g., a prioritized signaling radio bearer (SRB) over a data radio bearer (DRB).

SUMMARY

A method of wireless communication is described. The method may include communicating via a relay wireless communication link, the communicating including communications using a plurality of bearers; configuring a header of a packet for transmission on the relay wireless communication link that is processed by a relay wireless device to convey an indication of a QoS parameter set; and transmitting the packet including the configured header on the relay wireless communication link according to the QoS parameter set.

An apparatus for wireless communication is described. The apparatus may include means for communicating via a relay wireless communication link, the communicating including communications using a plurality of bearers; means for configuring a header of a packet for transmission on the relay wireless communication link that is processed by a relay wireless device to convey an indication of a QoS parameter set; and means for transmitting the packet including the configured header on the relay wireless communication link according to the QoS parameter set.

Another apparatus for wireless communication is described. The apparatus may include a processor, memory in electronic communication with the processor, and instructions stored in the memory. The instructions may be operable to cause the processor to communicate via a relay wireless communication link, the communicating including communications using a plurality of bearers; configure a header of a packet for transmission on the relay wireless communication link that is processed by a relay wireless device to convey an indication of a QoS parameter set; and transmit the packet including the configured header on the relay wireless communication link according to the QoS parameter set.

A non-transitory computer readable medium for wireless communication is described. The non-transitory computer-readable medium may include instructions operable to cause a processor to communicate via a relay wireless communication link, the communicating including communications using a plurality of bearers; configure a header of a packet for transmission on the relay wireless communication link that is processed by a relay wireless device to convey an indication of a QoS parameter set; and transmit the packet including the configured header on the relay wireless communication link according to the QoS parameter set.

Some examples of the method, apparatus, and non-transitory computer-readable medium described above may further include processes, features, means, or instructions for identifying that the packet belongs to a first bearer, the first bearer being associated with the QoS parameter set.

Some examples of the method, apparatus, and non-transitory computer-readable medium described above may further include processes, features, means, or instructions for identifying a bearer mapping configuration associated with the relay wireless communication link; and configuring, according to the bearer mapping configuration, the header of the packet to include an identifier that conveys an indication of the first bearer.

Some examples of the method, apparatus, and non-transitory computer-readable medium described above may further include processes, features, means, or instructions for configuring the relay wireless device with a mapping of the QoS parameter set indication and a ProSe per-packet priority (PPPP) indicator of the first bearer.

In some examples of the method, apparatus, and non-transitory computer-readable medium described above, the header includes one of an adaptation header or a packet data convergence protocol (PDCP) header.

Some examples of the method, apparatus, and non-transitory computer-readable medium described above may further include processes, features, means, or instructions for aggregating two or more bearers into a relay bearer; and selecting at least one of the QoS parameter set associated with the first bearer or a bitrate parameter to apply to the relay bearer.

In some examples of the method, apparatus, and non-transitory computer-readable medium described above, the bitrate parameter includes one of an aggregate maximum bitrate (AMBR) or a guaranteed bitrate (GBR).

Some examples of the method, apparatus, and non-transitory computer-readable medium described above may further include processes, features, means, or instructions for configuring the header to include the indication of the QoS parameter set and at least one of an allocation and retention policy (ARP) indicator of the first bearer or a PPPP indicator of the first bearer.

In some examples of the method, apparatus, and non-transitory computer-readable medium described above, the relay wireless communication link includes one of an uplink connection or a downlink connection using at least one of a Uu radio interface between a base station and the relay wireless device or a PC5 radio interface between the relay wireless device and a remote wireless device.

In some examples of the method, apparatus, and non-transitory computer-readable medium described above, the QoS parameter set includes a QoS class identifier (QCI).

Some examples of the method, apparatus, and non-transitory computer-readable medium described above may further include processes, features, means, or instructions for determining an ARP parameter associated with the packet of the first bearer; and determining the transmission of the packet according to the determined ARP parameter.

In some examples of the method, apparatus, and non-transitory computer-readable medium described above, the first bearer includes one of a SRB or a DRB.

Some examples of the method, apparatus, and non-transitory computer-readable medium described above may further include processes, features, means, or instructions for identifying, during a connection establishment procedure, a mapping between the QoS parameter set and a plurality of radio bearers of the relay wireless communication link.

In some examples of the method, apparatus, and non-transitory computer-readable medium described above, the mapping may be identified according to a radio resource control (RRC) configuration message exchanged during the connection establishment procedure.

A method of wireless communication is described. The method may include communicating via a relay wireless communication link, the communicating including communications using a plurality of bearers; and receiving, on the relay wireless communication link, a packet including a header processed by a relay wireless device that is configured to convey an indication of a QoS parameter set.

An apparatus for wireless communication is described. The apparatus may include means for communicating via a relay wireless communication link, the communicating including communications using a plurality of bearers; and means for receiving, on the relay wireless communication link, a packet including a header processed by a relay wireless device that is configured to convey an indication of a QoS parameter set.

Another apparatus for wireless communication is described. The apparatus may include a processor, memory in electronic communication with the processor, and instructions stored in the memory. The instructions may be operable to cause the processor to communicate via a relay wireless communication link, the communicating including communications using a plurality of bearers; and receive, on the relay wireless communication link, a packet including a header processed by a relay wireless device that is configured to convey an indication of a QoS parameter set.

A non-transitory computer readable medium for wireless communication is described. The non-transitory computer-readable medium may include instructions operable to cause a processor to communicate via a relay wireless communication link, the communicating including communications using a plurality of bearers; and receive, on the relay wireless communication link, a packet including a header processed by a relay wireless device that is configured to convey an indication of a QoS parameter set.

Some examples of the method, apparatus, and non-transitory computer-readable medium described above may further include processes, features, means, or instructions for identifying, based at least in part on the QoS parameter set, a first bearer used to convey the packet on the relay wireless communication link, the first bearer being associated with the QoS parameter set.

Some examples of the method, apparatus, and non-transitory computer-readable medium described above may further include processes, features, means, or instructions for identifying the first bearer based at least in part on the QoS parameter set indication and at least one of an ARP indicator of the first bearer or a PPPP indicator of the first bearer.

Some examples of the method, apparatus, and non-transitory computer-readable medium described above may further include processes, features, means, or instructions for identifying, during a connection establishment procedure, a mapping between the QoS parameter set of the plurality of bearers and the plurality of radio bearers of the relay wireless communication link.

In some examples of the method, apparatus, and non-transitory computer-readable medium described above, the mapping may be identified according to a RRC configuration message exchanged during the connection establishment procedure.

Some examples of the method, apparatus, and non-transitory computer-readable medium described above may further include processes, features, means, or instructions for identifying a bearer mapping configuration associated with the relay wireless communication link; and identifying, in the header of the packet and according to the bearer mapping configuration, an identifier that further conveys an indication of the first bearer.

In some examples of the method, apparatus, and non-transitory computer-readable medium described above, the relay wireless communication link includes one of an uplink connection or a downlink connection using at least one of a Uu radio interface between a base station and the relay wireless device or a PC5 radio interface between the relay wireless device and a remote wireless device.

In some examples of the method, apparatus, and non-transitory computer-readable medium described above, the first bearer may include one of a SRB or a DRB.

In some examples of the method, apparatus, and non-transitory computer-readable medium described above, the header may include one of an adaptation header or a PDCP header.

In some examples of the method, apparatus, and non-transitory computer-readable medium described above, the QoS parameter set may include a QCI.

In some examples of the method, apparatus, and non-transitory computer-readable medium described above, the header may include one of an adaptation header or a PDCP header.

A method of wireless communication is described. The method may include communicating via a relay wireless communication link, the communicating including communications using a plurality of bearers; identifying a bearer mapping configuration associated with the relay wireless communication link; identifying a packet for transmission on the relay wireless communication link belonging to a first bearer; configuring, according to the bearer mapping configuration, a header of the packet that is processed by a relay wireless device to include an identifier, the identifier conveying information associated with the first bearer; and transmitting the packet including the header on the relay wireless communication link.

An apparatus for wireless communication is described. The apparatus may include means for communicating via a relay wireless communication link, the communicating including communications using a plurality of bearers; means for identifying a bearer mapping configuration associated with the relay wireless communication link; identifying a packet for transmission on the relay wireless communication link belonging to a first bearer; means for configuring, according to the bearer mapping configuration, a header of the packet that is processed by a relay wireless device to include an identifier, the identifier conveying information associated with the first bearer; and means for transmitting the packet including the header on the relay wireless communication link.

Another apparatus for wireless communication is described. The apparatus may include a processor, memory in electronic communication with the processor, and instructions stored in the memory. The instructions may be operable to cause the processor to communicate via a relay wireless communication link, the communicating including communications using a plurality of bearers; identify a bearer mapping configuration associated with the relay wireless communication link; identify a packet for transmission on the relay wireless communication link belonging to a first bearer; configure, according to the bearer mapping configuration, a header of the packet that is processed by a relay wireless device to include an identifier, the identifier conveying information associated with the first bearer; and transmit the packet including the header on the relay wireless communication link.

A non-transitory computer readable medium for wireless communication is described. The non-transitory computer-readable medium may include instructions operable to cause a processor to communicate via a relay wireless communication link, the communicating including communications using a plurality of bearers; identify a bearer mapping configuration associated with the relay wireless communication link; identify a packet for transmission on the relay wireless communication link belonging to a first bearer; configure, according to the bearer mapping configuration, a header of the packet that is processed by a relay wireless device to include an identifier, the identifier conveying information associated with the first bearer; and transmit the packet including the header on the relay wireless communication link.

Some examples of the method, apparatus, and non-transitory computer-readable medium described above may further include processes, features, means, or instructions for selecting an identifier associated with a first virtual radio bearer, wherein the first virtual radio bearer corresponds to the first bearer and the relay wireless communication corresponds to a radio bearer.

Some examples of the method, apparatus, and non-transitory computer-readable medium described above may further include processes, features, means, or instructions for identifying a QoS parameter set for the first bearer; and selecting the identifier based at least in part on the QoS parameter set for the first bearer.

In some examples of the method, apparatus, and non-transitory computer-readable medium described above, the QoS parameter set may include a QCI.

Some examples of the method, apparatus, and non-transitory computer-readable medium described above may further include processes, features, means, or instructions for configuring a buffer status report (BSR) to convey at least one of the identifier, wherein the identifier may be associated with a virtual radio bearer, or an aggregated traffic status from a plurality of remote wireless devices.

In some examples of the method, apparatus, and non-transitory computer-readable medium described above, the relay wireless communication link may include one of an uplink or a downlink connection using at least one of a PC5 radio interface between the relay wireless device and a remote wireless device or a Uu radio interface between a base station and the relay wireless device.

In some examples of the method, apparatus, and non-transitory computer-readable medium described above, the header c may include one of an adaptation header or a PDCP header.

Some examples of the method, apparatus, and non-transitory computer-readable medium described above may further include processes, features, means, or instructions for establishing a mapping between a plurality of identifiers and a corresponding plurality of virtual radio bearers, wherein each virtual radio bearer corresponds to a bearer of the plurality of bearers.

In some examples of the method, apparatus, and non-transitory computer-readable medium described above, each bearer of the plurality of bearers may include an associated QoS parameter set.

In some examples of the method, apparatus, and non-transitory computer-readable medium described above, the mapping may be established during a connection establishment procedure and may be exchanged using a RRC configuration message.

Some examples of the method, apparatus, and non-transitory computer-readable medium described above may further include processes, features, means, or instructions for configuring the header to include a plurality of identifiers, each identifier conveying information associated with a corresponding bearer.

In some examples of the method, apparatus, and non-transitory computer-readable medium described above, the first bearer may include one of a SRB or a DRB.

A method of wireless communication is described. The method may include communicating via a relay wireless communication link, the communicating including communications using a plurality of bearers; identifying a bearer mapping configuration associated with the relay wireless communication link; receiving a packet on a first bearer of the relay wireless communication link, the packet including a header that is processed by a relay wireless device and is configured, according to the radio bearer mapping configuration, to include an identifier that conveys information associated with the first bearer; and identifying the first bearer based at least in part on the identifier.

An apparatus for wireless communication is described. The apparatus may include means for communicating via a relay wireless communication link, the communicating including communications using a plurality of bearers; means for identifying a bearer mapping configuration associated with the relay wireless communication link; means for receiving a packet on a first bearer of the relay wireless communication link, the packet including a header that is processed by a relay wireless device and is configured, according to the radio bearer mapping configuration, to include an identifier that conveys information associated with the first bearer; and means for identifying the first bearer based at least in part on the identifier.

Another apparatus for wireless communication is described. The apparatus may include a processor, memory in electronic communication with the processor, and instructions stored in the memory. The instructions may be operable to cause the processor to communicate via a relay wireless communication link, the communicating including communications using a plurality of bearers; identify a bearer mapping configuration associated with the relay wireless communication link; receive a packet on a first bearer of the relay wireless communication link, the packet including a header that is processed by a relay wireless device and is configured, according to the radio bearer mapping configuration, to include an identifier that conveys information associated with the first bearer; and identify the first bearer based at least in part on the identifier.

A non-transitory computer readable medium for wireless communication is described. The non-transitory computer-readable medium may include instructions operable to cause a processor to communicate via a relay wireless communication link, the communicating including communications using a plurality of bearers; identify a bearer mapping configuration associated with the relay wireless communication link; receive a packet on a first bearer of the relay wireless communication link, the packet including a header that is processed by a relay wireless device and is configured, according to the radio bearer mapping configuration, to include an identifier that conveys information associated with the first bearer; and identify the first bearer based at least in part on the identifier.

Some examples of the method, apparatus, and non-transitory computer-readable medium described above may further include processes, features, means, or instructions for determining that the identifier may be associated with a first virtual radio bearer, wherein the first virtual radio bearer corresponds to the first bearer and the relay wireless communication link corresponds to a radio bearer.

Some examples of the method, apparatus, and non-transitory computer-readable medium described above may further include processes, features, means, or instructions for establishing a mapping between a plurality of identifiers and a corresponding plurality of virtual radio bearers, wherein each virtual radio bearer corresponds to a bearer of the plurality of bearers.

In some examples of the method, apparatus, and non-transitory computer-readable medium described above, each bearer of the plurality of bearers may include an associated QoS parameter set.

In some examples of the method, apparatus, and non-transitory computer-readable medium described above, the mapping may be established during a connection establishment procedure and may be exchanged using a RRC configuration message.

Some examples of the method, apparatus, and non-transitory computer-readable medium described above may further include processes, features, means, or instructions for determining that the header includes a plurality of identifiers, each identifier conveying information associated with a corresponding bearer; and identifying the first bearer from among the plurality of identifiers.

Some examples of the method, apparatus, and non-transitory computer-readable medium described above may further include processes, features, means, or instructions for determining, based at least in part on the identifier, a QoS parameter set for the first bearer.

In some examples of the method, apparatus, and non-transitory computer-readable medium described above, the QoS parameter set may include a QCI.

In some examples of the method, apparatus, and non-transitory computer-readable medium described above, each associated QoS parameter set may include a QCI.

In some examples of the method, apparatus, and non-transitory computer-readable medium described above, the relay wireless communication link may include one of an uplink or a downlink connection using at least one of a PC5 radio interface between the relay wireless device and a remote wireless device or a Uu radio interface between a base station and the relay wireless device.

In some examples of the method, apparatus, and non-transitory computer-readable medium described above, the header may include one of an adaptation header or a PDCP header.

In some examples of the method, apparatus, and non-transitory computer-readable medium described above, the first bearer may include one of a SRB or a DRB.

DETAILED DESCRIPTION

Figure 1:
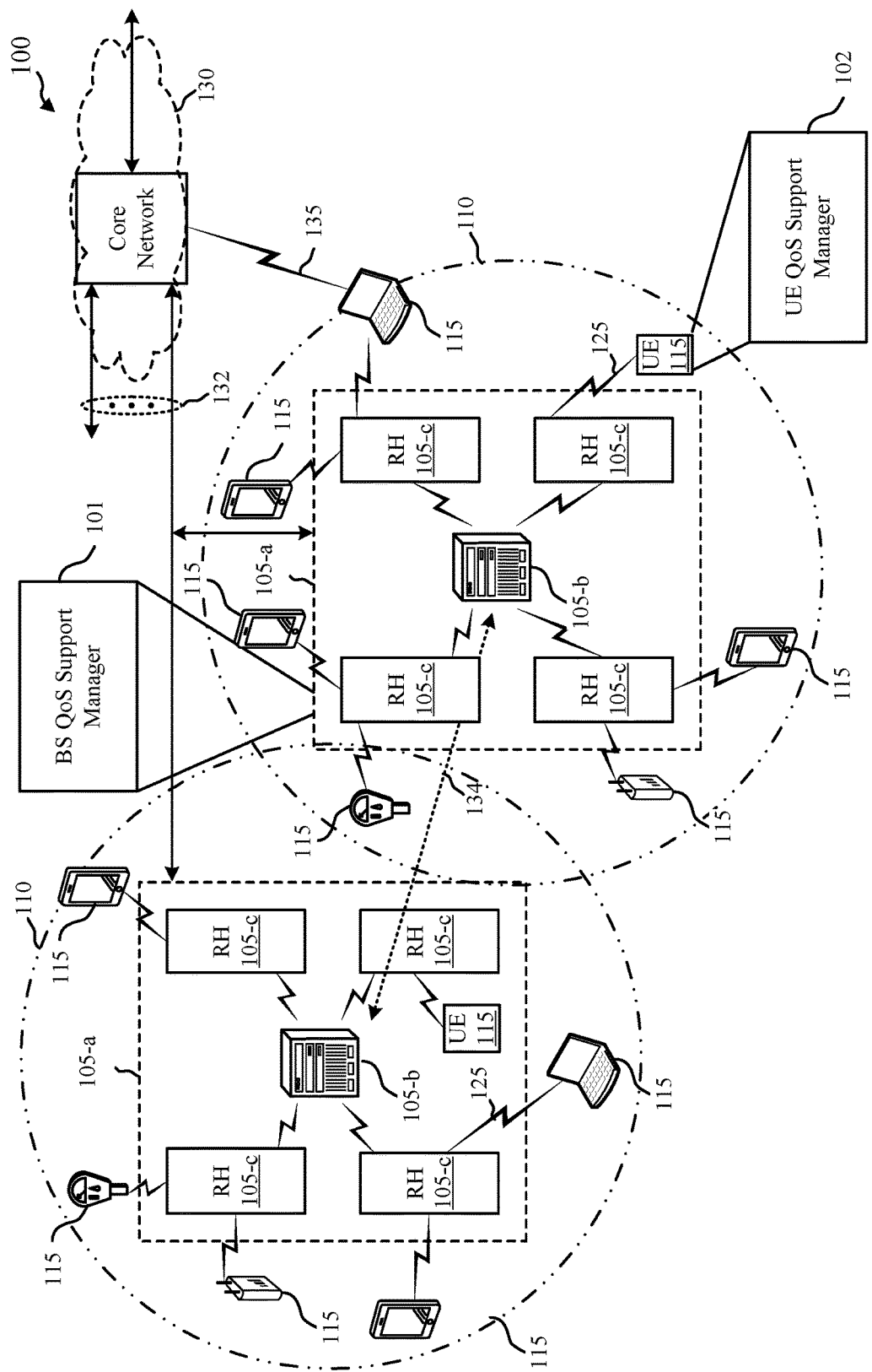
FIG. 1 illustrates an example of a system for wireless communication that supports QoS support for L2 based D2D relay, in accordance with one or more aspects of the present disclosure.

Wireless devices (e.g., UEs) are generally mobile and may, at times, lose connection to a base station, which by extension disconnects the UE from accessing certain network functions. Existing ProSe, D2D, etc., services generally provide a mechanism for UEs to communicate directly with one another to exchange information, for example, a remote UE may benefit from leveraging a ProSe connection to a neighboring UE as a relay link. For example, a remote UE outside the coverage area of a base station may establish a ProSe connection with a neighboring UE that is within the coverage area of the base station. In some aspects, the remote UE to may use of the relay link even when in the coverage area of the base station. For example, by making use of the relay link (which may require much lower transmission power due to the short range), the remote UE with limited transmission capability may reach the network via the relay UE. It may also help to preserve power for those low power remote UEs, e.g., internet-of-things (IoT) devices. The neighboring UE (or relay UE) may provide a relay link to the remote UE that permits the remote UE to reconnect with the base station and, by extension, to network functions. To support relay operations, a PC5 radio interface link may be established between the remote UE and the relay UE and a Uu radio interface link may be established between the relay UE and the base station. In some examples, the relay UE may support relay links with multiple remote UEs.

Conventional techniques may not support bearer differentiation in a relay wireless communication link scenarios. For example, UEs typically use bearers that are established for communicating different types of information. Examples of bearers may include, but are not limited to, a SRB, which exchanges various signaling and overhead information, and evolved packet system (EPS) bearers and a DRB that is used to exchange data, user traffic, Internet Protocol (IP) packets, and the like. Each bearer may be identified using a logical channel identifier (LCID) and may have an associated QoS parameter set, e.g., maximum bit rate, guaranteed bit rate, and the like. Moreover, each UE may support only a certain number of bearers, e.g., eight radio bearers. Differentiation between bearers in a relay environment may not be supported using conventional relay wireless communication links, but may be necessary to ensure each bearer is treated according to its associated QoS parameter set.

Aspects of the disclosure are initially described in the context of a wireless communication system, such as a system that supports relay wireless communication link(s). Generally, the wireless communication system may be a packet-based wireless communication system such that information is exchanged between the remote UE and the relay UE and also between the relay UE and the base station using one or more packets. Multiple packets may be multiplexed during a transmission using different time/frequency resources where individual packet(s) may be associated with a relay UE or the remote UE. In some aspects, differentiation between bearers may be accomplished on a per-packet basis. Broadly, the described techniques provide for different approaches for bearer differentiation per packet. In a first approach, each packet may carry the corresponding QoS information for the associated bearer, e.g., QoS class identifier (QCI), allocation and retention policy (ARP), etc., in a packet header. This may be implemented using a mapping configuration (e.g., without additional signaling) and may provide a coarse degree of differentiation. Additional indicator(s) may optionally be used to further differentiate between SRBs and DRBs, for example. In a second approach, the packet header may include a special identifier used to create virtual radio bearers, where each virtual radio bearer maps to a corresponding bearer (e.g., SRB, DRB, etc.). This may be implemented using additional signaling over the relay link(s), but may provide a finer degree of differentiation between bearers and, when appropriate, bearers for different remote UEs. In some aspects, some or all of the aspects from the first approach and the second approach may be combined in a hybrid approach for bearer differentiation.

Thus, in certain aspects a relay wireless communication link may be used for wireless communication between a remote UE and a relay UE (e.g., a PC5 radio interface) and/or between the relay UE and a base station (e.g., a Uu radio interface). The relay link may use multiple bearers (e.g., SRB(s) and/or DRB(s)) for the relay UE and/or the remote UE). Each bearer may have an associated QoS parameter set and the relay link may use packet(s) for wireless communications. In one approach, a transmitting device (which could be the remote UE, the relay UE, and/or the base station, depending on the situation) may identify a particular packet for transmission on the relay link, the packet belonging to a first bearer. The transmitting device may configure a header of the packet (e.g., a L2 header that is processed by the relay UE) to carry or otherwise convey an indication of the QoS parameter set. The transmitting device transmits the packet and the receiving device (which could be the remote UE, relay UE, and/or base station, depending upon the situation) may use the QoS information in the header to identify the first bearer and/or otherwise treat the packet according to the QoS parameter set.

Additionally or alternatively, the transmitting device may identify a bearer mapping configuration associated with the relay link. The transmitting device may select an identifier of a first virtual bearer corresponding to the first bearer (e.g., according to the bearer mapping configuration) and configure the header to carry or otherwise convey the identifier. The transmitting device may transmit the packet and the receiving device may use the identifier and the bearer mapping configuration to identify the first bearer.

Aspects of the disclosure are further illustrated by and described with reference to apparatus diagrams, system diagrams, and flowcharts that relate to QoS support for L2 based D2D relay.

FIG. 1 illustrates an example of a wireless communication system 100, in accordance with one or more aspects of the present disclosure. The wireless communication system 100 may include network devices 105 (e.g., gNodeBs (gNBs), evolved node Bs (eNBs)), UEs 115, and a core network 130. In some examples, the wireless communication system 100 may be a LTE (or LTE-Advanced (LTE-A) network, or a NR network. In some cases, wireless communication system 100 may support enhanced broadband communications, ultra-reliable (i.e., mission critical) communications, low latency communications, and communications with low-cost and low-complexity devices.

The core network 130 may provide user authentication, access authorization, tracking, IP connectivity, and other access, routing, or mobility functions. At least some of the network devices 105 (e.g., network device 105-a), which may be an example of a base station (e.g., eNB, network access devices, gNB), or network device 105-b, which may be an example of an access node controller (ANC)), may interface with the core network 130 through backhaul links 132 (e.g., S1, S2, etc.) and may perform radio configuration and scheduling for communication with the UEs 115. In various examples, the network devices 105-b may communicate, either directly or indirectly (e.g., through core network 130), with each other over backhaul links 134 (e.g., X1, X2, etc.), which may be wired or wireless communication links.

Each network device 105-b may also additionally or alternatively communicate with a number of UEs 115 through a number of other network devices 105-c, where network device 105-c may be an example of a smart radio head (or through a number of smart radio heads). In alternative configurations, various functions of each network device 105 may be distributed across various network devices 105 (e.g., radio heads and access network controllers) or consolidated into a single network device 105 (e.g., a base station).

The communication networks that may accommodate some of the various disclosed examples may be packet-based networks that operate according to a layered protocol stack. In the user plane, communications at the bearer over packet data convergence protocol (PDCP) layer may be IP-based or non-IP based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid Automatic Repeat Request (HARD) to provide retransmission at the MAC layer to improve link efficiency. In the control plane, the radio resource control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, a wireless node, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an IoT device, an Internet of Everything (IoE) device, a machine type communication (MTC) device, an appliance, an automobile, or the like. A UE 115 may be able to communicate with various types of network devices 105-a, network devices 105-c, base stations, access points, or other network devices, including macro eNBs, small cell eNBs, relay base stations, and the like. A UE 115 may communicate with the core network 130 through communication link 135.

In some cases, a UE 115 may also be able to communicate directly with other UEs (e.g., using a peer-to-peer (P2P) or D2D protocol). One or more of a group of UEs 115 utilizing D2D communications may be within the coverage area 110 of a cell. Other UEs 115 in such a group may be outside the coverage area 110 of a cell, or otherwise unable to receive transmissions from a network device 105. In some cases, groups of UEs 115 communicating via D2D communications may utilize a one-to-many (1:M) system in which each UE 115 transmits to every other UE 115 in the group. In some cases, a network device 105 facilitates the scheduling of resources for D2D communications. In other cases, D2D communications are carried out independent of a core network 130. Another example of direct UE 115 communications may include V2X and/or V2V communications.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

In some aspects, the described techniques refer to a requesting device and a responding device. The requesting device may refer to a UE 115 and/or a network device 105 (also referred to as a base station) when configured or otherwise acting as a device requesting data from a responding device. The responding device may refer to a UE 115 and/or a network device 105 when configured or otherwise acting as a device providing the data to the requesting device.

The communication links 125 shown in wireless communication system 100 may include uplink (UL) channels from a UE 115 to a network device 105-c, and/or downlink (DL) channels, from a network device 105-c to a UE 115. The DL channels may also be called forward link channels, while the UL channels may also be called reverse link channels. Control information and data may be multiplexed on an UL channel or DL according to various techniques. Control information and data may be multiplexed on a DL channel, for example, using time-division multiplexing (TDM) techniques, frequency-division multiplexing (FDM) techniques, or hybrid TDM-FDM techniques. In some examples, the control information transmitted during a transmit time interval (TTI) of a DL channel may be distributed between different control regions in a cascaded manner (e.g., between a common control region and one or more UE-specific control regions).

Wireless communication system 100 may operate in an ultra high frequency (UHF) frequency region using frequency bands from 700 MHz to 2600 MHz (2.6 GHz), although in some cases wireless local area networks (WLANs) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communication system 100 may support millimeter wave (mmW) communications between UEs 115 and network devices 105. Devices operating in mmW or EHF bands may have multiple antennas to allow beamforming. That is, a network device 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a network device 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

In some cases, wireless communication system 100 may utilize both licensed and unlicensed radio frequency spectrum bands. For example, wireless communication system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as network devices 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Wireless communication system 100 may include or support networks used for vehicle based communications, also referred to as V2X, V2V networks, and/or C-V2X networks. Vehicle based communication networks may provide always on telematics where UEs, e.g., v-UEs, communicate to V2N, to V2P UEs, to V2I, and to other v-UEs (e.g., via the network). The vehicle based communication networks may support a safe, always-connected driving experience by providing intelligent connectivity where traffic signal/timing, real-time traffic and routing, safety alerts to pedestrians/bicyclist, collision avoidance information, etc., are exchanged.

In some cases, a UE 115 may also be able to communicate directly with other UEs (e.g., using a P2P, ProSe, or D2D protocols). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a 1:M system in which each UE 115 transmits to every other UE 115 in the group. In some cases, a base station 105 facilitates the scheduling of resources for D2D communications. In other cases, D2D communications are carried out independent of a base station 105.

Generally, aspects of the described techniques may refer to a transmitting device and/or receiving device. Within the context of a relay wireless communication link (e.g., a D2D or ProSe-based relay link), a transmitting device may refer to one or more of a remote UE 115 (e.g., transmitting to a relay UE 115), a relay UE 115 (e.g., transmitting to either or both of the remote UE 115 and base station 105), and/or a base station 105 (e.g., transmitting to a relay UE 115). Similarly, a receiving device may refer to one or more of a remote UE 115 (e.g., receiving a transmission from a relay UE 115), a relay UE 115 (e.g., receiving a transmission from either or both of the remote UE 115 and base station 105), and/or a base station 105 (e.g., receiving a transmission from a relay UE 115).

One or more of network devices 105 may include a base station (BS) QoS support manager 101. One or more of the UEs 115 may include a UE QoS support manager 102. The functions of the BS QoS support manager 101 and/or the UE QoS support manager 102 may be similar, depending upon whether the network device 105 and/or the UE 115 is acting as a transmitting device or a receiving device. Thus, a UE 115 and/or network device 105 may support one or more aspects of the described techniques for bearer differentiation. For example, a transmitting device (UE 115 and/or network device 105, depending upon the situation) may be communicating via a relay wireless communication link. The communications may use a plurality of bearers. The transmitting device may identify packet for transmission on the relay link, the packet belonging to a first bearer. The first bearer may have an associated QoS parameter set. The transmitting device may configure a header of the packet to convey an indication of the QoS parameter set. The packet may be processed by the relay wireless device (e.g., relay UE 115), e.g., processed by the L2 of the relay wireless device. The transmitting device may transmit the packet with the header on the relay link and according to the QoS parameter set (e.g., the packet being afforded the same QoS as the associated bearer). A receiving device may receive the packet and use the indicated QoS parameter set to identify the first bearer that was used to convey the packet on the relay link.

Additionally or alternatively, the transmitting device may configure a header of a packet for transmission on the relay wireless communication link. Additionally or alternatively, the transmitting device may identify a bearer mapping configuration associated with the relay link. The transmitting device may identify a packet for transmission on the relay link, the packet belonging to a first bearer. The transmitting device may use the bearer mapping configuration to select an identifier associated with a first virtual radio bearer. The first virtual radio bearer may correspond to the first bearer and the relay link may correspond to a radio bearer. The transmitting device may configure, according to the bearer mapping configuration, a header of the packet that is processed by the relay wireless device to include an identifier. The identifier may carry or otherwise convey information associated with the first bearer. The transmitting device may transmit the packet with the header on the relay link. A receiving device may receive the packet and determine that the identifier is associated with the first virtual radio bearer. The receiving device may identify the first bearer based at least in part on the identifier.

Figure 2:
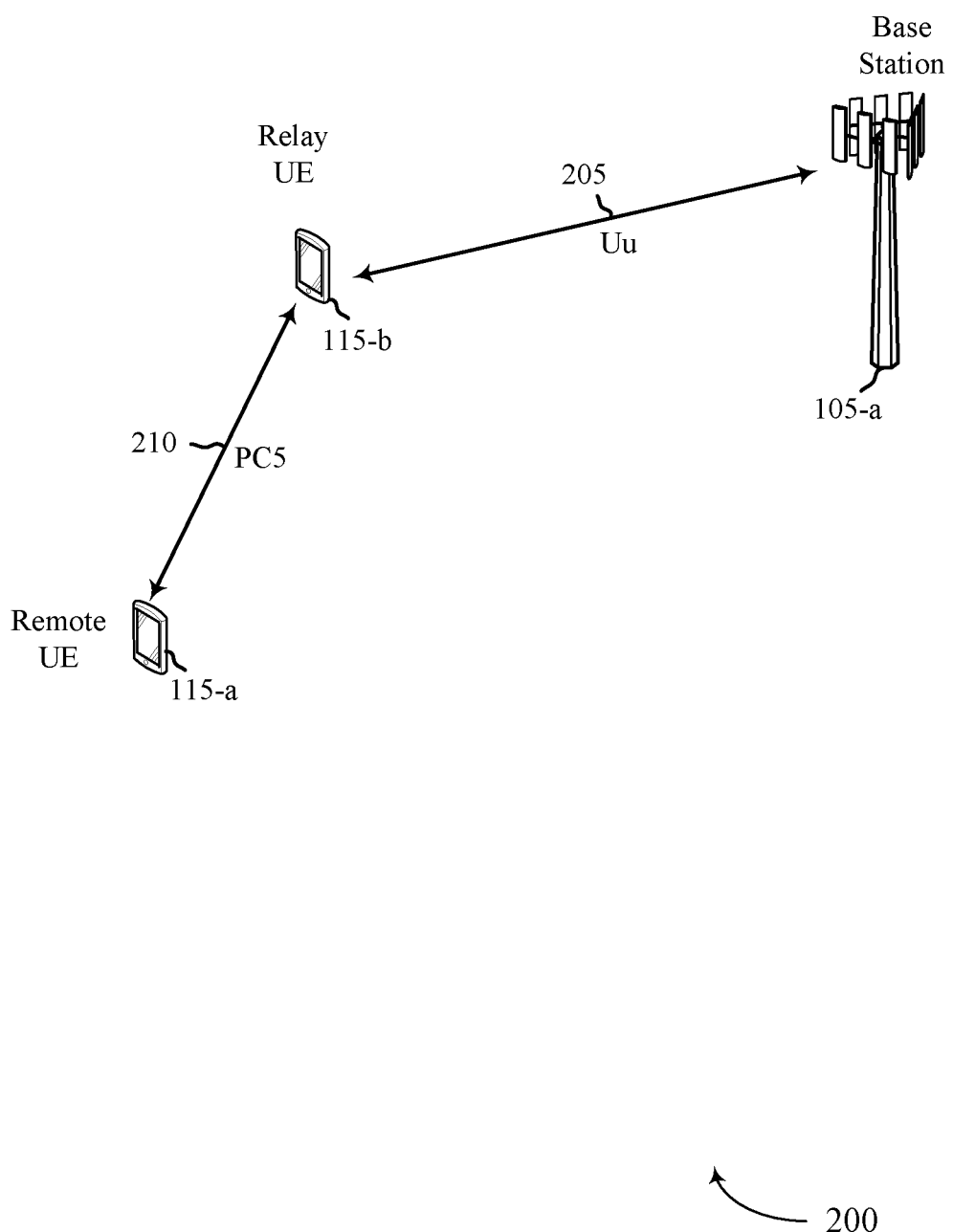
FIG. 2 illustrates an example of a system for wireless communication that supports QoS support for L2 based D2D relay in accordance with one or more aspects of the present disclosure.

FIG. 2 illustrates an example of a system for wireless communication 200 that supports QoS support for L2 based D2D relay, in accordance with one or more aspects of the present disclosure. Wireless communication system 200 may implement aspect(s) of wireless communication system 100. Wireless communication system 200 may include a base station 105-a, a remote UE 115-a and a relay UE 115-b, which may be examples of the corresponding devices described herein. The base station 105-a, the remote UE 115-a, and/or the relay UE 115-b may be examples of a transmitting device and/or a receiving device. Wireless communication system 200 may support a relay wireless communication link.

Wireless communication system 200 may include relay UE 115-b providing a relay link connecting remote UE 115-a to base station 105-a and other network elements. In one example, the relay wireless communication link may include a link 205 between the base station 105-a and the relay UE 115-b and a link 210 between the relay UE 115-b and the remote UE 115-a. Link 205 may be an example of a radio interface between the base station 105-a and the relay UE 115-b and may be, in some examples, a Uu radio interface, a LTE-Uu radio interface, and the link. Link 210 may be an example of a link established using D2D, ProSe, and other UE-to-UE direct communication protocols. In some examples, link 210 may include a PC5 radio interface link. In some example, link 210 may be a subset of the Uu radio interface.

The relay wireless communication link may also provide connectivity for each of the remote UE 115-a and the relay UE 115-b to other network functions associated with a core network (such as the core network 130). For example, the relay wireless communication link may provide connectivity between the remote UE 115-a and the relay UE 115-b to a MME, a S-GW, a P-GW, and the like. Each of remote UE 115-a and relay UE 115-b may have an individual S1 interface established between the UE 115 and the MME, S-GW, etc., via the base station 105-a. Within the relay link, remote UE 115-a may send NAS information directly to the MME (e.g., without being processed by the relay UE 115-b). Data from the remote UE 115-a may be transmitted to the base station 105-a using a sidelink user-plane and/or Uu user-plane link.

In some aspects, one or more of the remote UE 115-a, relay UE 115-b, and/or base station 105-a may use a layer protocol architecture that includes different layers, e.g., Layer 1 (L1), L2, and Layer 3 (L3). Broadly, L1 may be the lowest layer (or physical layer) and implements various physical layer signaling functions. L2 is generally above the physical layer and may implement the link between the UE 115 and the base station 105-a. L2 may be broken down into the user-plane and the control-plane. L3 may be considered the IP layer.

In the user-plane, L2 may include a MAC sublayer (e.g., priority handling and multiplexing of logical channels into transport channels), a RLC sublayer (e.g., packet segmentation and reassembly to communicate over logical channels), a PDCP sublayer (e.g., multiplexing between different radio bearers and logical channels), and/or an adaptation sublayer (e.g., manages aspect(s) of a P2P link). In the control plane, L2 may include a RRC protocol layer that provides establishment, configuration, and maintenance of an RRC connection supporting radio bearers for user-plane data.

Wireless communication system 200 may also use a plurality of bearers for communicating. Example bearers may include, but are not limited to, a radio bearer (e.g., an SRB and/or DRB), an S1 bearer, an e-radio access bearer, an EPS bearer, and end-to-end bearer, and the like. Each bearer may have an associated LCID, an associated QoS parameter set, and the like. Moreover, each of the remote UE 115-a and the relay UE 115-b may have their own respective bearers. Typically, the bearers associated with a particular UE 115 may be tracked according to their LCID and are communicated according to their associated QoS parameter set. In a relay wireless communication link, bearer differentiation and associated QoS support may introduce additional considerations. Such considerations may be heightened by configurations limiting the number of bearers that can be associated with a particular UE.

Aspects of the present disclosure may provide for improved techniques for bearer differentiation, e.g., how to differentiate between relay UE 115-b and remote UE 115-a bearers and how to afford each bearer the appropriate QoS treatment during communications. Thus, for example a high priority bearer of the remote UE 115-a may be communicated using the appropriate priority level even though the communication relies on a radio bearer between the relay UE 115-b and the base station 105-a. Aspects of the described techniques may be used individually or may be combined, in some examples.

In a first approach, each packet may carry the corresponding QoS information for a bearer, e.g., QCI, ARP, etc., in a header of the packet, e.g., an adaptation header, a PDCP header, and the like. This may use a bearer mapping configuration rather than additional signaling and may use additional parameter(s) to provide for differentiation between different bearer types.

In a downlink example for the Uu radio interface, this approach may include each packet carrying the QoS information. For example, the user plane packet coming down from the serving gateway (SGW) to the eNB may be associated with an EPS bearer, which has an associated QoS profile on the eNB. The eNB may identify the EPS bearer identifier of the packet based on the S1-U tunnel, or transport protocol marking. Using the EPS bearer identifier, it would be able to retrieve the corresponding QoS parameters (e.g., QoS parameter set) from the corresponding remote UE context. The eNB may also determine the radio bearer to send the packet based on the remote UE context. In this particular example, the remote UE may be associated with the relay UE, and therefore, the packets may be sent via a radio bearer of the relay UE associated with this remote UE, or the EPS bearer of this remote UE. The packet sent via the relay UE's radio bearer may carry the QCI and ARP value in the adaptation (or PDCP) header and the relay UE 115-*b* may process each packet accordingly. The bit rate metrics for the packet (e.g., AMBR, GBR, maximum bitrate (MBR), etc.) may be managed or selected by base station 105-*a*, rather than by the relay UE 115-*b*. The adaptation layer may include an identifier to differentiate packets of different remote UEs.

In the downlink example for the PC5 radio interface, QoS handling may again be on a per packet basis. For example, the relay UE 115-*b* may map QCI and ARP indications corresponding to a PPPP indicator when planning transmission of the packet to the remote UE 115-*a* on the PC5 radio link. The mapping of the QCI/ARP to the PPPP may be based on a configuration established or managed by base station 105-*a* and/or based on ProSe functions provisioned information. The relay UE 115-*b* may re-order packets of different bearers based on the PPPP and the associated/ derived packet delay budget (PDB).

In an uplink example for the Uu radio interface, QoS handling may again be on a per-packet basis. The relay UE 115-*b* may receive a packet on the PC5 radio interface, which includes in the L2 header, e.g., adaptation layer header or PDCP header to the QoS indication, e.g., QCI or ARP. The relay UE 115-*b* may decide the uplink DRB to use based on the QCI/ARP carried in the packet header. The QCI/ARP to DRB mapping may be configured by the base station 105-*a*, e.g., in a RRC connection reconfiguration message during DRB setup/update. The uplink GBR, MBR and AMBR may be selected or managed by the base station 105-*a*, rather than the relay UE 115-*b*, during admission control and after obtaining the PDCP protocol data unit (PDU) of the remote UE 115-*a* or the relay UE 115-*b*. In the uplink example for the PC5 radio interface, QoS handling may again be on a per-packet basis. The remote UE 115-*a* may map the QoS provided of a DRB to PPPP and PDB and transmit the packet over the PC5 relay link. The corresponding QCI and ARP may be carried in the header of the adaption layer (or PDCP layer) over the PC5 relay link. The GBR, MBR and/or AMBR may be selected or otherwise managed by the remote UE 115-*a*, e.g., to avoid packet loss at the relay UE 115-*b*. The QCI/ARP to PPPP/PDB mapping may be obtained via the UE configuration or as part of the PC5 link setup from the relay UE 115-*b*.

Admission control in the first approach may include the base station 105-*a* aggregating different DRB requirements into relay DRBs, e.g., the base station 105-*a* may promote the QCI of a particular DRB or increase the AMBR/GBR/ MBR. The base station 105-*a* may select or otherwise manage uplink GBR/MBR/AMBR when obtaining the PDCP PDU of the remote UE 115-*a*. Admission control in the first approach may include the relay UE 115-*b* not managing GBR/MBR/AMBR enforcement. The relay UE 115-*b* may use the ARP do selective packet transmission in the uplink.

RRC connection related messages according to the first approach may include each packet carrying additional information in the RRC connection reconfiguration message when each of the eight available DRBs is setup via the Uu radio interface. Additionally, when the DRB is used for the remote UE 115-*a*, the mapping of the QCI and ARP to PPP may be provided in the RRC connection reconfiguration message.

Thus, aspects of the first approach may include the remote UE 115-*a*, the relay UE 115-*b*, and the base station 105-*a* communicating via a relay wireless communication link (e.g., either or both of links 205 and 210). The communications may include communicating using a plurality of bearers, e.g., radio bearers and non-radio bearers. A transmitting device may configure a header of a packet for transmission on the relay wireless communication link. A transmitting device (e.g., any of the remote UE 115-*a*, the relay UE 115-*b*, or the base station 105-*a*, depending on the situation) may identify a packet for transmission on the relay link. The packet may belong to or otherwise be associated with a first bearer that has an associated QoS parameter set. The transmitting device may configure a header of the packet (e.g., a L2 header processed by the relay UE 115-*b*) to convey an indication of the QoS parameter set and transmit the packet with the header on the relay link. The packet may be transmitted according to the QoS parameter set, e.g., at the appropriate priority level, with the appropriate bit rate, etc. Thus, QoS support may be provided for packets of bearers of the remote UE 115-*a* during transmission between the remote UE 115-*a* to the relay UE 115-*b* and between the relay UE 115-*b* to the base station 105-*a*.

In a second approach, the header of the packet may include a special identifier that is used to create virtual bearers, with each virtual bearer mapping to a bearer of the plurality of bearers. The packet header may be an adaptation header and/or a PDCP header. The second approach may include additional signaling over the PC5 and Uu radio interfaces, but may also provide increased QoS control and a more refined granularity for bearer differentiation.

In a downlink example of the Uu radio interface, the identifier may support using more than a predetermined number of virtual bearers, e.g., more than eight. For example, when a bearer, e.g., EPS bearer is setup for the remote UE, signaling from the MME may inform the eNB (or base station) regarding the QoS profile and bearer identifications, e.g. the E-RAB ID. As the eNB is aware of the association of the remote UE and relay UE, it understands the need to carry the corresponding bearer of the remote UE in a relay UE's radio bearer. After identified the corresponding radio bearer of the relay UE, the eNB may send a RRC connection reconfiguration message to inform the relay UE of such arrangement, and the corresponding identifier to be used in the L2 header of the packets for this bearer, EPS bearer. The RRC connection reconfiguration message may also inform the relay UE regarding the QoS profile of this particular bearer. Similarly, the eNB may inform the remote UE of the identifier to use via an RRC connection reconfiguration message directly or via the relay UE. This identifier allows the bearer of the remote UE to be transferred within the radio bearer of the relay UE as a virtual radio bearer. The adaptation (or PDCP) layer header may include an identifier for each of the EPS bearers, DRBs, etc. The relay UE 115-*b* may map the identifier to the corresponding EPS bearer/DRB(s) and their corresponding QoS profiles or parameters. The base station 105-*a* may configure the relay UE 115-*b* with a bearer mapping for the virtual bearers (e.g., QCI, ARP, etc.) in a RRC connection reconfiguration message, for example. In the downlink example for the PC5 radio interface, the relay UE 115-*b* may map the identifier to the corresponding link 210 with the remote UE 115-*a*. For each remote UE, the relay UE 115-*b* may setup a virtual link whenever it receives a RRC connection reconfiguration message for the virtual DRB(s) over the Uu radio interface. This may use a PC5 signaling protocol (PC5-SP) that includes a mechanism to allow the relay UE 115-*b* triggered link setup. The relay UE 115-*b* may transmit the packets over the PC5 radio interface based on the associated QoS parameter set for the virtual link, e.g., extending beyond the traditional PPPP functions. For example, this may allow configuring the remote UE to include additional information on the QoS in the message header.

In an uplink example of Uu radio interface, the remote UE 115-*a* may maintain a mapping of the virtual link of the PC5 interface and its own DRBs. The QoS profile associated with the virtual link may be configured by the base station 105-*a* or negotiated with the relay UE 115-*b* during the link setup over the PC5 interface. In some examples, no special QoS indicator may need to be carried in the packet header over the PC5 radio interface other than the identifier of the virtual link. In the uplink example for the Uu radio interface, the relay UE 115-*b* may manage each virtual link separately and therefore may use a buffer status report (BSR) to indicate the virtual link identifier. The virtual link may be mapped by the base station 105-*a* to actual DRBs, and the associated QoS for each bearer may be implemented accordingly. Such mapping may also be used for SRB(s) of the remote UE 115-*a*.

Admission control in the second approach may include the base station 105-*a* selecting or managing the QoS profiles with the virtual DRBs over the Uu radio interface. The base station 105-*a* may store the mapping of the virtual DRB identifier and the actual DRB QoS parameter or DRB QoS parameter set. The base station 105-*a* may use the virtual identifier in the BSR for scheduling according to the QoS parameter or QoS parameter set. The relay UE 115-*b* may associate the QoS parameter set with the PC5 radio interface link of the corresponding virtual Uu DRBs. The relay UE 115-*b* may maintain a mapping of the PC5 virtual link and the Uu virtual DRB identifiers. The relay UE 115-*a* may report additional PC5 status information to base station 105-*a* to implement the virtual DRB admission.

RRC connection related messages according to the second approach may include an additional information element (IE) introduced in the RRC connection reconfiguration message. The additional IE may identify the additional QoS configuration for each virtual link/bearer. Thus, a RRC connection reconfiguration message may not be needed for each new virtual DRB ID. In some aspects, a "VirtualDRB-ToAddMod" IE may be added to a "RadioResourceConfigDedicated" IE, and with the associated virtual DRB identifier. The relay UE 115-*b* may use this virtual DRB identifier to request resources in the BSR, for example.

Thus, aspects of the second approach may include the remote UE 115-*a*, the relay UE 115-*b*, and the base station 105-*a* communicating via a relay wireless communication link (e.g., either or both of links 205 and 210). The communications may include communicating using a plurality of bearers, e.g., radio bearers and non-radio bearers. A transmitting device may configure a header of a packet for transmission on the relay wireless communication link. A transmitting device (e.g., any of the remote UE 115-*a*, the relay UE 115-*b*, or the base station 105-*a*, depending on the situation) may identify a bearer mapping configuration associated with the relay link. The transmitting device may identify a packet for transmission on the relay link. The packet may belong to or otherwise be associated with a first bearer that has an associated QoS parameter or QoS parameter set (or profile). The transmitting device may select an identifier associated with a first virtual radio bearer that corresponds to the first bearer. The transmitting device may configure a header of the packet (e.g., a L2 header processed by the relay UE 115-*b*) to convey an indication of the identifier and transmit the packet with the header on the relay link. The packet may be transmitted according to the QoS parameter or QoS parameter set, e.g., at the appropriate priority level, with the appropriate bit rate, etc. Thus, QoS support may be provided for differentiation of bearer packets of the remote UE 115-*a* during transmission between the remote UE 115-*a* to the relay UE 115-*b* and between the relay UE 115-*b* to the base station 105-*a*.

As is discussed above, some or all of the aspects of the first and second approaches may be used in combination to support QoS support for L2 based D2D relay. For example, the header may carry the QoS parameter or QoS parameter set in combination with the virtual ink identifier. This may improve the granularity of the bearer identification and treatment at the remote UE 115-*a*, the relay UE 115-*b*, and/or the base station 105-*a*. In addition, the above examples focused on the user plane traffic, i.e., EPS bearers and DRBs. However, similar techniques can be used for the differentiation of the SRBs. For SRBs of the remote UE, some default configuration of the QoS treatment can be provided to the eNB or default QoS handling can be standardized. In this case, the packets that is used for carrying the signaling message could carry the corresponding QoS indication, e.g. other than the normal QCI value or ARP value. Similarly, when a second approach is used for virtual radio bearer identifier, the eNB or relay UE could use a special identifier to represent the signaling bearers and the RRC Connection Reconfiguration message can carry some special IEs just for virtual SRB binding.

Figure 3:
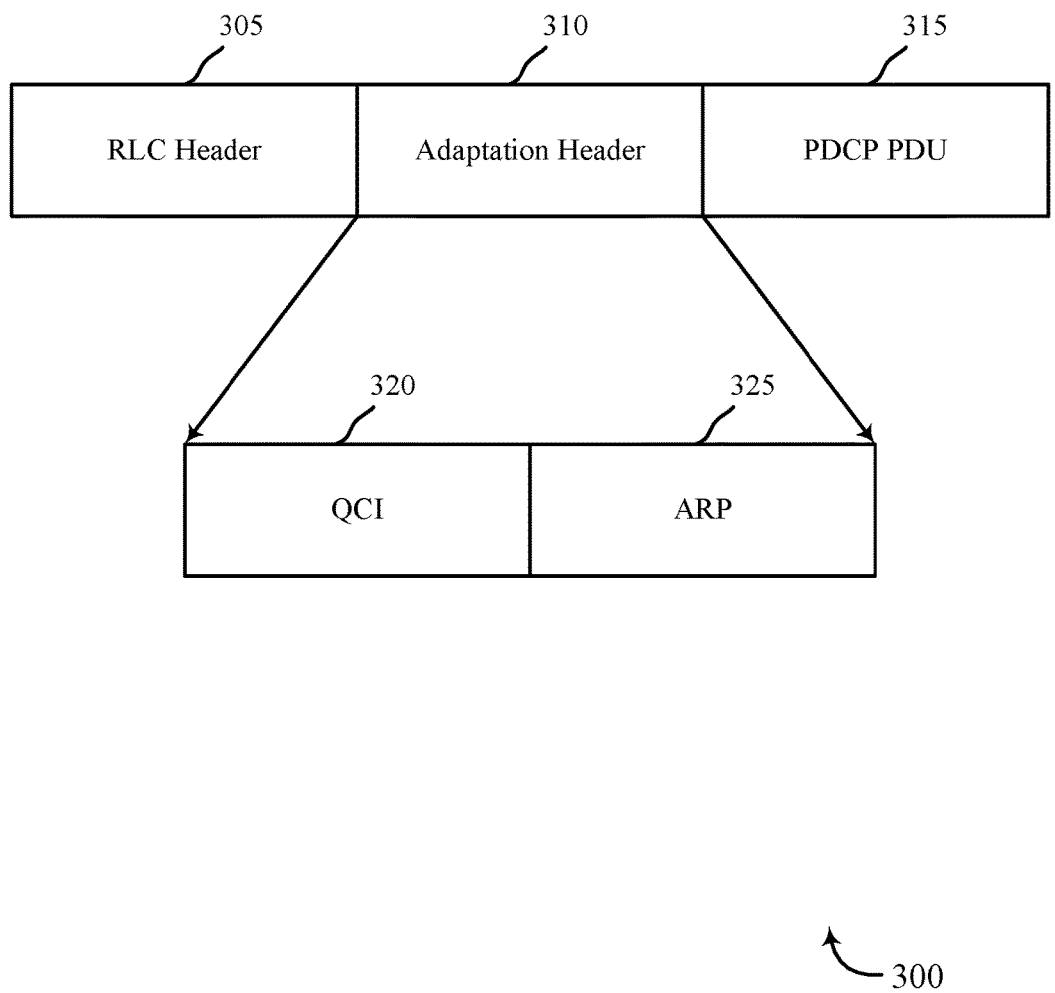
FIG. 3 illustrates an example of a header configuration that supports QoS support for L2 based D2D relay, in accordance with one or more aspects of the present disclosure.

FIG. 3 illustrates an example of a header configuration 300 that supports QoS support for L2 based D2D relay, in accordance with one or more aspects of the present disclosure. Header configuration 300 may implement aspect(s) of wireless communication system 100 and/or 200, as described herein. For example, a remote UE, a relay UE, and/or a base station may implement aspect(s) of header configuration 300. A remote UE, relay UE, and/or base station may be examples of the corresponding devices described herein. Generally, the header configuration 300 may implement aspect(s) of the first approach for QoS support in L2 based D2D relay, as is described herein.

Broadly, header configuration 300 may include a header of the packet belonging to a particular bearer. The packet header may include a RLC header 305 (e.g., a header configured by the RLC sublayer of the L2), an adaptation header 310 (e.g., a header configured by the adaptation sublayer of the L2), a PDCP PDU 315 (e.g., a PDU added by the PDCP sublayer of the L2). It is to be understood that the packet will also contain additional information, such as a data payload, control information, and the like.

The adaptation header 310 may be configured to convey an indication of the QoS parameter or QoS parameter set for the packet belonging to the bearer. That is, the QoS parameter or QoS parameter set may provide information used to support the packet being transmitted according to the QoS profile for the bearer, e.g., at the appropriate priority level, using the appropriate bit rate, and the like. In the example header configuration 300, the adaptation header 310 may convey the QoS parameter or QoS parameter set by including a QCI indicator 320 and/or an ARP indicator 325. The adaptation sublayer may carry the QoS parameter or QoS parameter set over the PC5 and/or Uu radio interface from the remote UE, which may be processed or otherwise used by the relay UE to map the packet to the correct bearer. Thus, a transmitting device may configure a header of a packet to carry or otherwise convey an indication of the QoS parameter or QoS parameter set using header configuration 300.

Although the header configuration 300 shows the QoS parameter or QoS parameter set being carried in the adaptation header 310, it is to be understood that the PDCP PDU 315 may be used to carry the QoS parameter or QoS parameter set.

Figure 4:
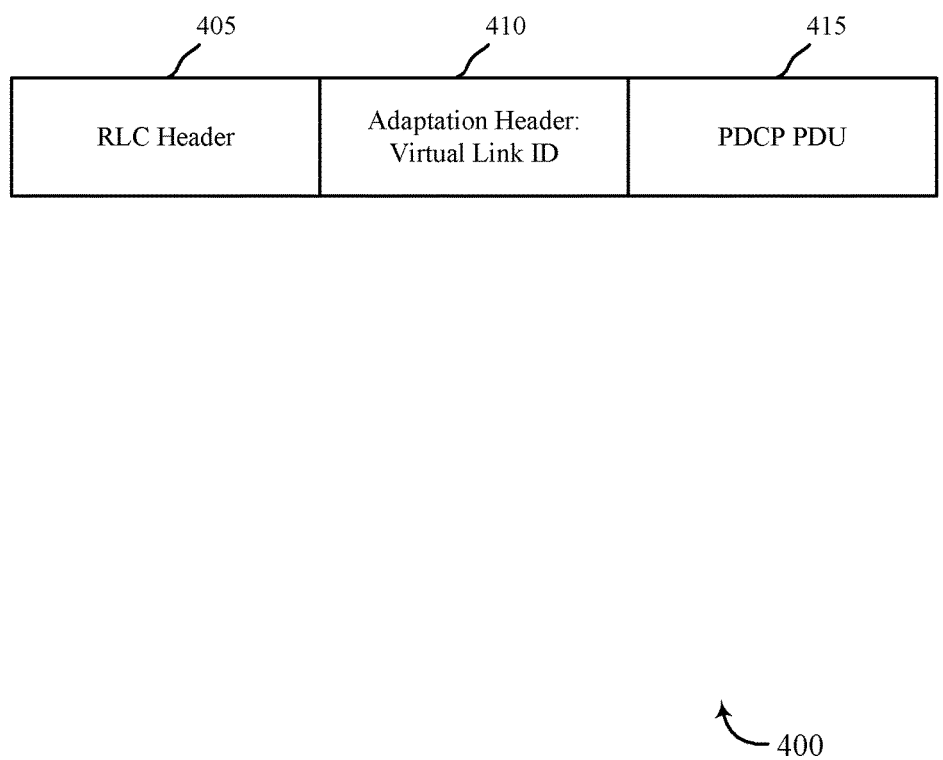
FIG. 4 illustrates an example of a header configuration that supports QoS support for L2 based D2D relay, in accordance with one or more aspects of the present disclosure.

FIG. 4 illustrates an example of a header configuration 400 that supports QoS support for L2 based D2D relay, in accordance with one or more aspects of the present disclosure. Header configuration 400 may implement aspect(s) of wireless communication system 100 and/or 200, as described herein. For example, a remote UE, a relay UE, and/or a base station may implement aspect(s) of header configuration 400. A remote UE, relay UE, and/or base station may be examples of the corresponding devices described herein. Generally, the header configuration 400 may implement aspect(s) of the second approach for QoS support in L2 based D2D relay, as is described herein.

Broadly, header configuration 400 may include a header of the packet belonging to a particular bearer. The packet header may include a RLC header 405 (e.g., a header configured by the RLC sublayer of the L2), an adaptation header 410 (e.g., a header configured by the adaptation sublayer of the L2), a PDCP PDU 415 (e.g., a PDU added by the PDCP sublayer of the L2). It is to be understood that the packet will also contain additional information, such as a data payload, control information, and the like.

The adaptation header 310 may be configured to convey an indication of the virtual link identifier for the packet belonging to the bearer. That is, the virtual ink identifier (or simply identifier) may provide information used to support the packet being transmitted according to the QoS profile for the particular bearer, e.g., at the appropriate priority level, using the appropriate bit rate, and the like.

In the example header configuration 400, the adaptation header 410 may convey the virtual link identifier using a various examples. In one example, the virtual link identifier may be carried by a particular pair, e.g., a source L2 identifier and a destination L2 identifier pair. This may provide for bearer differentiation per remote UE. In another example, the virtual link identifier may be conveyed by the source/destination L2 identifier pair and may also include an additional virtual link identifier added in the adaptation sublayer (or PDCP sublayer) between the RLC header 405 and the PDCP PDU 415. This may support differentiation of the different EPS bearers (e.g., default bearer and dedicated bearers) of a remote UE. The virtual link identifier may correspond to the EPS bearer ID of the remote UE, for example. Thus, a transmitting device may configure a header of a packet to carry or otherwise convey an indication of the identifier (e.g., virtual link identifier) using header configuration 400.

Although the header configuration 400 shows the virtual link identifier being carried in the adaptation header 410, it is to be understood that the PDCP PDU 415 may be used to carry the virtual link identifier.

Figure 5:
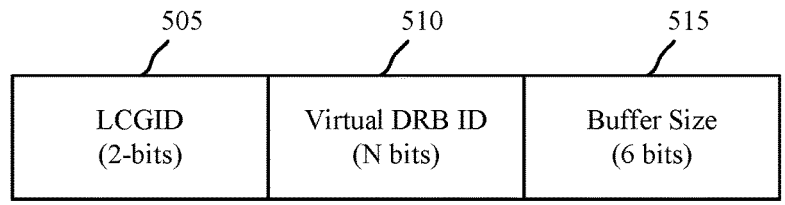
FIG. 5 illustrates an example of a header configuration that supports QoS support for L2 based D2D relay, in accordance with one or more aspects of the present disclosure.
Figure 5:
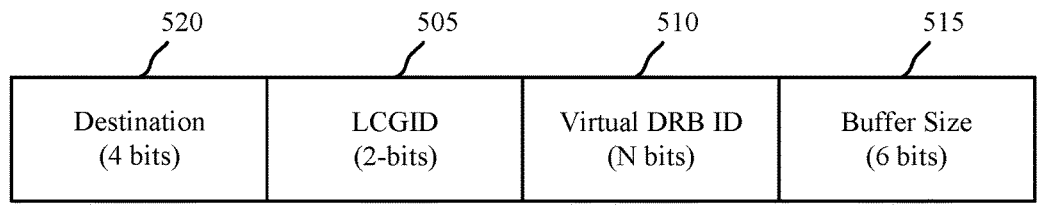

FIG. 5 illustrates an example of a header configuration 500 that supports QoS support for L2 based D2D relay, in accordance with one or more aspects of the present disclosure. Header configuration 500 may implement aspect(s) of wireless communication system 100 and/or 200, as described herein. Header configuration 500 may implement aspects of header configuration 400, as described herein. For example, a remote UE, a relay UE, and/or a base station may implement aspect(s) of header configuration 500. A remote UE, relay UE, and/or base station may be examples of the corresponding devices described herein. Generally, the header configuration 500 may implement aspect(s) of the second approach for QoS support in L2 based D2D relay, as is described herein.

Broadly, header configuration 500 may be used in a header of the packet belonging to a particular bearer. Header configuration 500 illustrates two examples of a header configuration. A first example may include a Uu radio interface header and the second example may include a PC5 radio interface header. The packet header may include a header having one or more control elements (CEs). Header configuration 500 in the Uu radio interface may include a logical channel group identifier (LCGID) CE 505 which may have five bits, a virtual DRB identifier CE 510 which may include N bits, and a buffer size CE 515 which may include six bits. Header configuration 500 in the PC5 radio interface may further include a destination CE 520, which includes or otherwise conveys an indication of the destination address of the header. As is discussed above, aspects of the described techniques may include conveying an identifier indicator using a BSR. For example, a relay UE may associate a QoS profile with the PC5 virtual link of the corresponding virtual Uu DRBs.

In some aspects, the LCGID CE 505 and the virtual DRB identifier CE 510 may be used together to category a virtual link established over the PC5 radio interface. For example, the relay UE may sent the mapping of LCGID and virtual DRB identifier and the UE identifier and bearer identifier to the base station using a UE information message, e.g., per ProSe/D2D protocols. The UE identifier may be a cell radio network temporary identifier (C-RNTI), in some examples. The buffer size CE 515 (e.g., the BSR) may carry an indication of the aggregated traffic from different remote UEs. The header configuration 500 may be used to distinguish the BSR between the relay UEs own Uu uplink request and the BSR for mode 1 scheduling over PC5.

In some aspects, the number of bits (e.g., value of N) for the virtual DRB identifier CE 510 may be selected according to a variety of factors. As one example, a large value of N may be selected to unique identify each different QoS bearer in each remote UE. In another example, a smaller value of N may be selected and the relay UE may aggregate similar traffic into the same virtual DRB identifier for scheduling.

Figure 6:
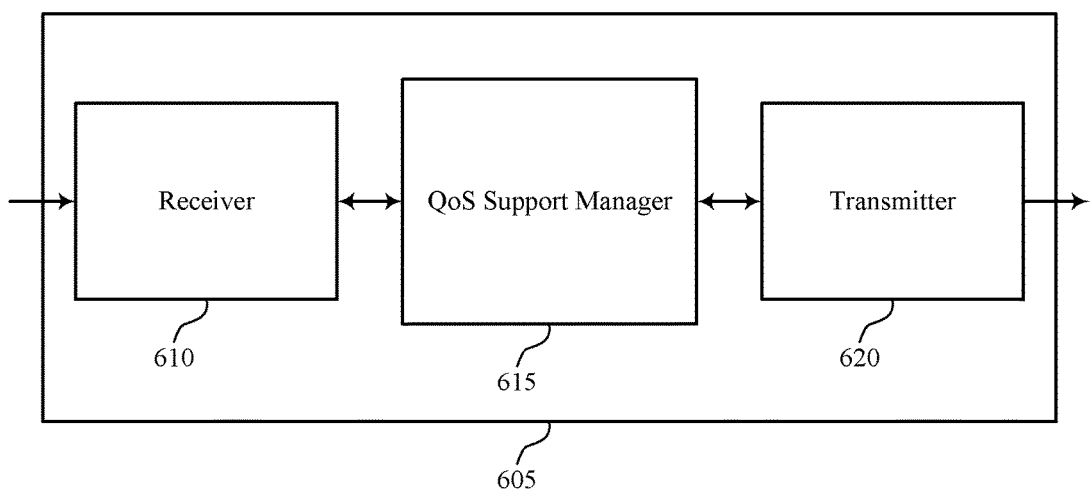
FIGS. 6 through 8 show diagrams of a device that supports QoS support for L2 based D2D relay, in accordance with one or more aspects of the present disclosure.

FIG. 6 shows a diagram 600 of a wireless device 605 that supports QoS support for L2 based D2D relay, in accordance with one or more aspects of the present disclosure. Wireless device 605 may be an example of aspects of a UE 115 (e.g., a relay UE and/or remote UE) or base station 105 as described herein. Wireless device 605 may include a receiver 610, a QoS support manager 615, and a transmitter 620. wireless device 605 may also include a processor. Each of these components may be in communication with one another (e.g., via one or more buses).

Receiver 610 may receive information such as packets, user data, or control information associated with various information channels (e.g., control channels, data channels, and information related to QoS support for L2 based D2D relay, etc.). Information may be passed on to other components of the device. The receiver 610 may be an example of aspects of the transceiver 935 described with reference to FIG. 9.

QoS support manager 615 may be an example of aspects of the QoS support manager 915 described with reference to FIG. 9.

QoS support manager 615 and/or at least some of its various sub-components may be implemented in hardware, software executed by a processor, firmware, or any combination thereof. If implemented in software executed by a processor, the functions of the QoS support manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The QoS support manager 615 and/or at least some of its various sub-components may be physically located at various positions, including being distributed such that portions of functions are implemented at different physical locations by one or more physical devices. In some examples, QoS support manager 615 and/or at least some of its various sub-components may be a separate and distinct component in accordance with various aspects of the present disclosure. In other examples, QoS support manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

QoS support manager 615 may communicate via a relay wireless communication link, the communicating including communications using a set of bearers. QoS support manager 615 may configure a header of a packet for transmission on the relay wireless communication link. QoS support manager 615 may also identify a packet for transmission on the relay wireless communication link belonging to a first bearer, the first bearer having an associated QoS parameter. QoS support manager 615 may configure a header of the packet that is processed by a relay wireless device to convey an indication of the QoS parameter or QoS parameter set. QoS support manager 615 may transmit the packet including the configured header on the relay wireless communication link according to the QoS parameter or QoS parameter set.

The QoS support manager 615 may also communicate via a relay wireless communication link, the communicating including communications using a set of bearers. QoS support manager 615 may receive a packet on the relay wireless communication link belongs to a first bearer, the packet including a header processed by a relay wireless device that is configured to convey an indication of a QoS parameter or QoS parameter set. QoS support manager 615 may identify, based on the QoS parameter or QoS parameter set, the first bearer used to convey the packet on the relay wireless communication link, the first bearer being associated with the QoS parameter or QoS parameter set.

The QoS support manager 615 may also communicate via a relay wireless communication link, the communicating including communications using a set of bearers. QoS support manager 615 may configure a header of a packet for transmission on the relay wireless communication link. QoS support manager 615 may identify a bearer mapping configuration associated with the relay wireless communication link. QoS support manager 615 may identify a packet for transmission on the relay wireless communication link belonging to the a first bearer. QoS support manager 615 may select an identifier associated with a first virtual radio bearer, where the first virtual radio bearer corresponds to the first bearer and the relay wireless communication corresponds to a radio bearer. QoS support manager 615 may configure, according to the bearer mapping configuration, a header of the packet that is processed by a relay wireless device to include an identifier, the identifier conveying information associated with the first bearer. QoS support manager 615 may transmit the packet including the header on the relay wireless communication link.

The QoS support manager 615 may also communicate via a relay wireless communication link, the communicating including communications using a set of bearers. QoS support manager 615 may identify a bearer mapping configuration associated with the relay wireless communication link. QoS support manager 615 may receive a packet on a first bearer of the relay wireless communication link, the packet including a header that is processed by a relay wireless device and is configured, according to the radio bearer mapping configuration, to include an identifier that conveys information associated with the first bearer. QoS support manager 615 may determine that the identifier is associated with a first virtual radio bearer, where the first virtual radio bearer corresponds to the first bearer and the relay wireless communication link corresponds to a radio bearer. QoS support manager 615 may identify the first bearer based on the identifier.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas.

Figure 7:
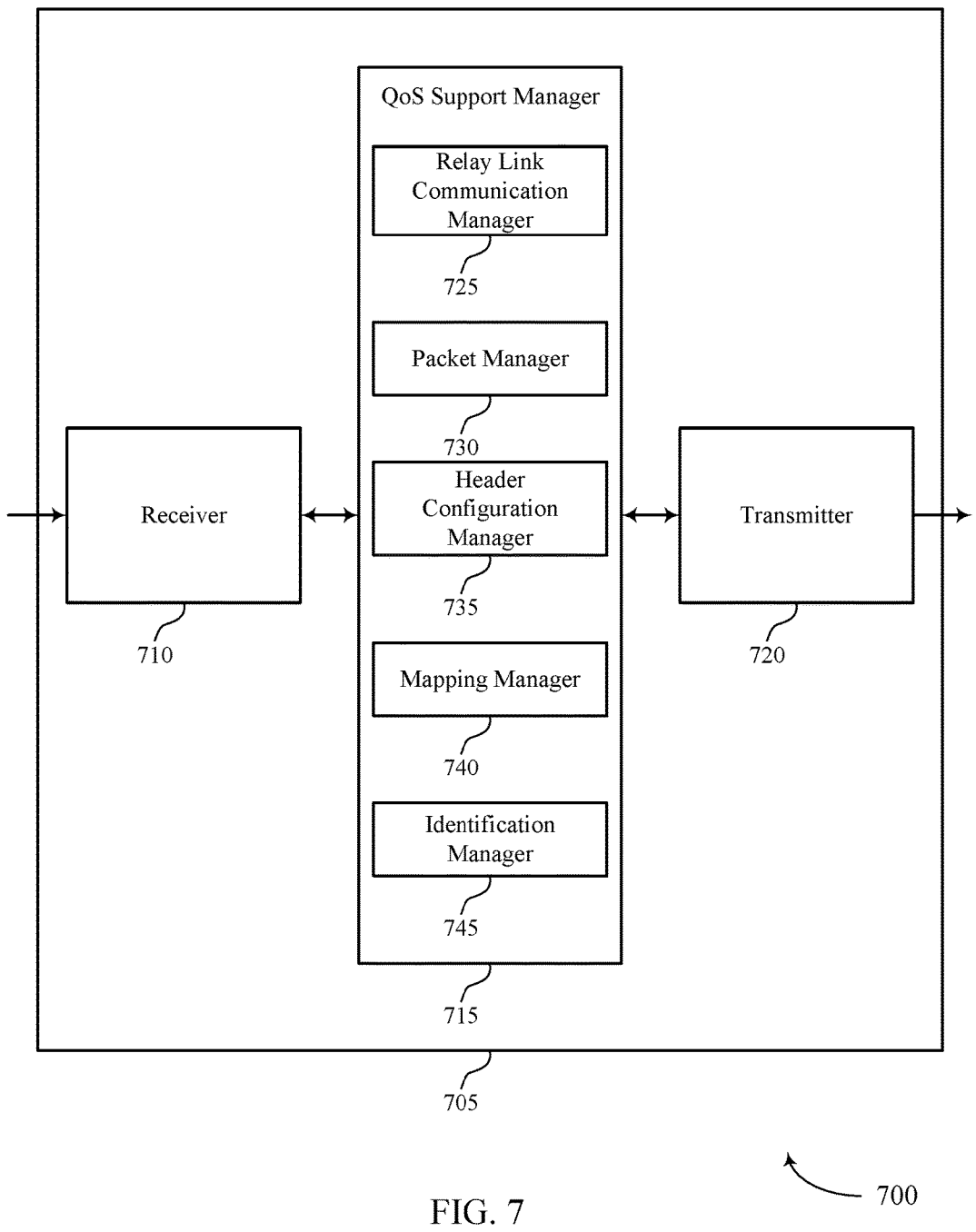

FIG. 7 shows a diagram 700 of a wireless device 705 that supports QoS support for L2 based D2D relay, in accordance with one or more aspects of the present disclosure. Wireless device 705 may be an example of aspects of a wireless device 605 or a UE 115 or base station 105 as described herein. Wireless device 705 may include a receiver 710, a QoS support manager 715, and a transmitter 720. wireless device 705 may also include a processor. Each of these components may be in communication with one another (e.g., via one or more buses).

Receiver 710 may receive information such as packets, user data, or control information associated with various information channels (e.g., control channels, data channels, and information related to QoS support for L2 based D2D relay, etc.). Information may be passed on to other components of the device. The receiver 710 may be an example of aspects of the transceiver 935 described with reference to FIG. 9.

QoS support manager 715 may be an example of aspects of the QoS support manager 915 described with reference to FIG. 9. QoS support manager 715 may also include a relay link communication manager 725, a packet manager 730, a header configuration manager 735, a mapping manager 740, and an identification manager 745.

Relay link communication manager 725 may communicate via a relay wireless communication link, the communicating including communications using a set of bearers. Relay link communication manager 725 may transmit the packet including the configured header on the relay wireless communication link according to the QoS parameter or QoS parameter set. Relay link communication manager 725 may transmit the packet including the header on the relay wireless communication link. In some cases, the relay wireless communication link includes one of an uplink or a downlink connection using a PC5 radio interface between the relay wireless device and a remote wireless device. In some cases, the relay wireless communication link includes one of an uplink or a downlink connection using a Uu radio interface between a base station and the relay wireless device. In some cases, the first bearer includes one of a SRB or a DRB.

Packet manager 730 may identify a packet for transmission on the relay wireless communication link belonging to a first bearer, the first bearer having an associated QoS parameter or QoS parameter set. Packet manager 730 may receive a packet on the relay wireless communication link belongs to a first bearer, the packet including a header processed by a relay wireless device that is configured to convey an indication of a QoS parameter or QoS parameter set. Packet manager 730 may identify a packet for transmission on the relay wireless communication link belonging to the a first bearer. Packet manager 730 may receive a packet on a first bearer of the relay wireless communication link, the packet including a header that is processed by a relay wireless device and is configured, according to the radio bearer mapping configuration, to include an identifier that conveys information associated with the first bearer. In some cases, the QoS parameter or QoS parameter set may include a QCI. In some cases, the first bearer includes one of a SRB or a DRB.

Header configuration manager 735 may configure a header of the packet that is processed by a relay wireless device, for example, to convey an indication of the QoS parameter or QoS parameter set. Header configuration manager 735 may identify, based on the QoS parameter or QoS parameter set, the first bearer used to convey the packet on the relay wireless communication link, the first bearer being associated with the QoS parameter or QoS parameter set. Header configuration manager 735 may configure, according to the bearer mapping configuration, a header of the packet that is processed by a relay wireless device to include an identifier, the identifier conveying information associated with the first bearer. Header configuration manager 735 may configure the header to include a set of identifiers, each identifier conveying information associated with a corresponding bearer. Header configuration manager 735 may determine that the header includes a set of identifiers, each identifier conveying information associated with a corresponding bearer. Header configuration manager 735 may identify the first bearer from among the set of identifiers. In some cases, the header includes one of an adaptation header or a PDCP header.

Mapping manager 740 may identify a bearer mapping configuration associated with the relay wireless communication link. Mapping manager 740 may establish a mapping between a set of identifiers and a corresponding set of virtual radio bearers, where each virtual radio bearer corresponds to a bearer of the set of bearers. Mapping manager 740 may identify, during a connection establishment procedure, a mapping between the QoS parameter or QoS parameter set of the set of bearers and the radio bearers of the relay wireless communication link. Mapping manager 740 may identify, in the header of the packet and according to the bearer mapping configuration, an identifier that further conveys an indication of the first bearer. Mapping manager 740 may identify, during a connection establishment procedure, a mapping between the QoS parameter (or QoS parameter set) of the set of bearers and the set of radio bearers of the relay wireless communication link. Mapping manager 740 may configure, according to the bearer mapping configuration, the header of the packet to include an identifier that conveys an indication of the first bearer. In some cases, the mapping is identified according to a RRC configuration message exchanged during the connection establishment procedure. In some cases, each bearer of the set of bearers includes an associated QoS parameter or QoS parameter set.

In some cases, the mapping is established during a connection establishment procedure and is exchanged using a RRC configuration message.

Identification manager 745 may select an identifier associated with a first virtual radio bearer, where the first virtual radio bearer corresponds to the first bearer and the relay wireless communication corresponds to a radio bearer. Identification manager 745 may determine that the identifier is associated with a first virtual radio bearer, where the first virtual radio bearer corresponds to the first bearer and the relay wireless communication link corresponds to a radio bearer. Identification manager 745 may identify the first bearer based on the identifier.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
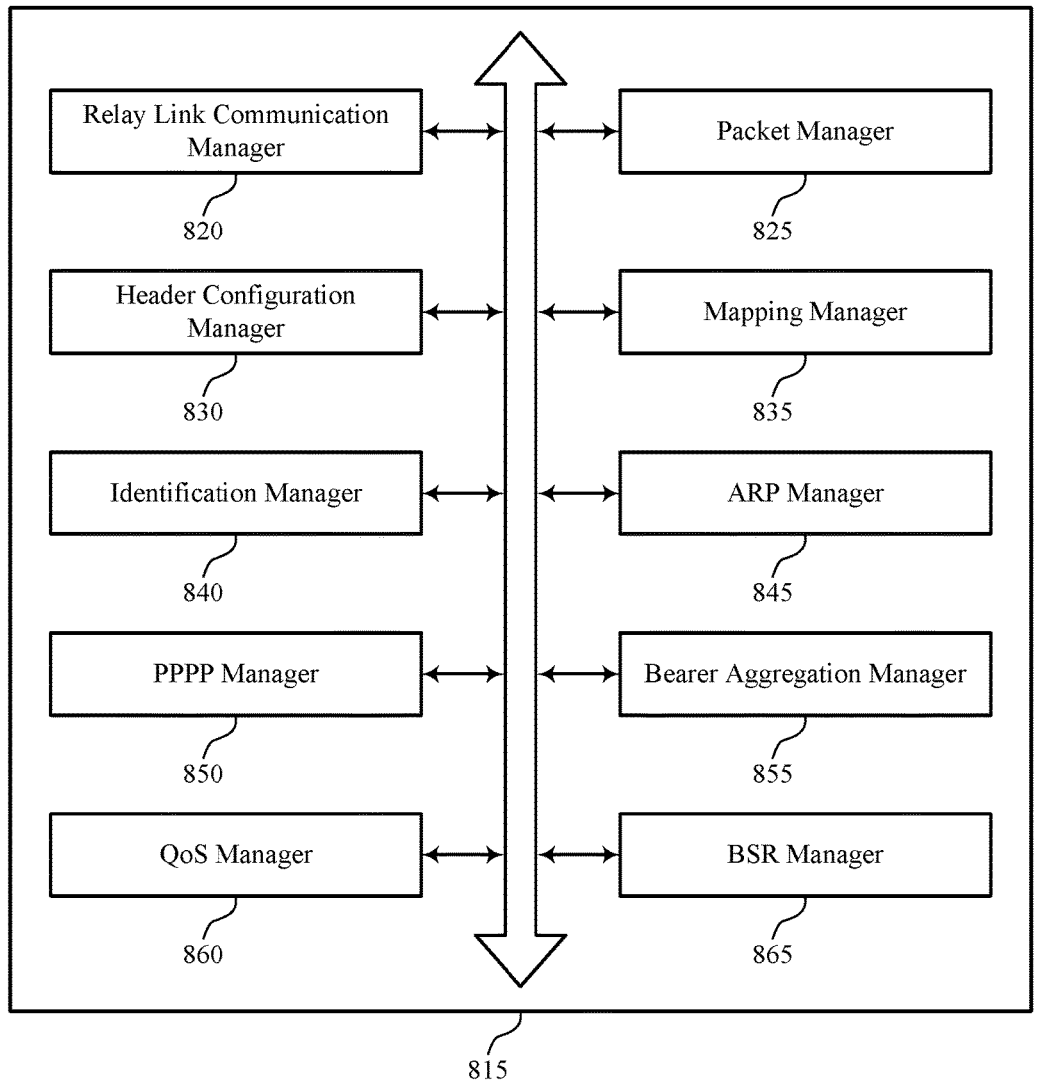

FIG. 8 shows a diagram 800 of a QoS support manager 815 that supports QoS support for L2 based D2D relay, in accordance with one or more aspects of the present disclosure. The QoS support manager 815 may be an example of aspects of a QoS support manager 615, a QoS support manager 715, or a QoS support manager 915 described with reference to FIGS. 6, 7, and 9. The QoS support manager 815 may include a relay link communication manager 820, a packet manager 825, a header configuration manager 830, a mapping manager 835, an identification manager 840, an ARP manager 845, a PPPP manager 850, a bearer aggregation manager 855, a QoS manager 860, and a BSR manager 865. Each of these modules may communicate, directly or indirectly, with one another (e.g., via one or more buses).

Relay link communication manager 820 may communicate via a relay wireless communication link, the communicating including communications using a set of bearers. Relay link communication manager 820 may transmit the packet including the configured header on the relay wireless communication link according to the QoS parameter or QoS parameter set. Relay link communication manager 820 may transmit the packet including the header on the relay wireless communication link. In some cases, the relay wireless communication link includes one of an uplink or a downlink connection using a PC5 radio interface between the relay wireless device and a remote wireless device. In some cases, the relay wireless communication link includes one of an uplink or a downlink connection using a Uu radio interface between a base station and the relay wireless device. In some cases, the first bearer includes one of a SRB or a DRB.

Packet manager 825 may identify a packet for transmission on the relay wireless communication link belonging to a first bearer, the first bearer having an associated QoS parameter or QoS parameter set. Packet manager 825 may receive a packet on the relay wireless communication link belongs to a first bearer, the packet including a header processed by a relay wireless device that is configured to convey an indication of a QoS parameter or QoS parameter set. Packet manager 825 may identify a packet for transmission on the relay wireless communication link belonging to the a first bearer. Packet manager 825 may receive a packet on a first bearer of the relay wireless communication link, the packet including a header that is processed by a relay wireless device and is configured, according to the radio bearer mapping configuration, to include an identifier that conveys information associated with the first bearer. In some cases, the QoS parameter or QoS parameter set includes a QCI. In some cases, the first bearer includes one of a SRB or a DRB.

Header configuration manager 830 may configure a header of the packet that is processed by a relay wireless device to convey an indication of the QoS parameter or QoS parameter set. Header configuration manager 830 may identify, based on the QoS parameter or QoS parameter set, the first bearer used to convey the packet on the relay wireless communication link, the first bearer being associated with the QoS parameter or QoS parameter set. Header configuration manager 830 may configure, according to the bearer mapping configuration, a header of the packet that is processed by a relay wireless device to include an identifier, the identifier conveying information associated with the first bearer, configure the header to include a set of identifiers, each identifier conveying information associated with a corresponding bearer. Header configuration manager 830 may determine that the header includes a set of identifiers, each identifier conveying information associated with a corresponding bearer. Header configuration manager 830 may identify the first bearer from among the set of identifiers. In some cases, the header includes one of an adaptation header or a PDCP header.

Mapping manager 835 may identify a bearer mapping configuration associated with the relay wireless communication link. Mapping manager 835 may establish a mapping between a set of identifiers and a corresponding set of virtual radio bearers, where each virtual radio bearer corresponds to a bearer of the set of bearers. Mapping manager 835 may identify, during a connection establishment procedure, a mapping between the QoS parameter (or QoS parameter set) of the set of bearers and the radio bearers of the relay wireless communication link. Mapping manager 835 may identify, in the header of the packet and according to the bearer mapping configuration, an identifier that further conveys an indication of the first bearer. Mapping manager 835 may identify, during a connection establishment procedure, a mapping between the QoS parameter (or QoS parameter set) of the set of bearers and the set of radio bearers of the relay wireless communication link. Mapping manager 835 may configure, according to the bearer mapping configuration, the header of the packet to include an identifier that conveys an indication of the first bearer. In some cases, the mapping is identified according to a RRC configuration message exchanged during the connection establishment procedure. In some cases, each bearer of the set of bearers includes an associated QoS parameter or QoS parameter set. In some cases, the mapping is established during a connection establishment procedure and is exchanged using a RRC configuration message. In some cases, the mapping is identified according to a RRC configuration message exchanged during the connection establishment procedure.

Identification manager 840 may select an identifier associated with a first virtual radio bearer, where the first virtual radio bearer corresponds to the first bearer and the relay wireless communication corresponds to a radio bearer. Identification manager 840 may determine that the identifier is associated with a first virtual radio bearer, where the first virtual radio bearer corresponds to the first bearer and the relay wireless communication link corresponds to a radio bearer, and identify the first bearer based on the identifier.

ARP manager 845 may configure the header to include the indication of the QoS parameter or QoS parameter set and an ARP indicator of the first bearer. ARP manager 845 may determine an ARP parameter associated with the packet of the first bearer. ARP manager 845 may determine the transmission of the packet according to the determined ARP parameter. ARP manager 845 may identify the first bearer based on the QoS parameter indication (or QoS parameter set indication) and an ARP indicator of the first bearer. In some cases, the relay wireless communication link includes one of an uplink connection or a downlink connection using a Uu radio interface between a base station and the relay wireless device.

PPPP manager 850 may configure the header to include the QoS parameter indication (or QoS parameter set indication) and a PPPP indicator of the first bearer. PPPP manager 850 may identify the first bearer based on the QoS parameter indication (or QoS parameter set indication) and a PPPP indicator of the first bearer. In some cases, the relay wireless communication link includes one of an uplink connection or a downlink connection using a PC5 radio interface between the relay wireless device and a remote wireless device.

Bearer aggregation manager 855 may aggregate two or more bearers into a relay bearer and select at least one of the QoS parameter (or QoS parameter set) associated with the first bearer or a bitrate parameter to apply to the relay bearer. In some cases, the bitrate parameter includes one of an AMBR or a GBR.

QoS manager 860 may identify a QoS parameter or QoS parameter set for the first bearer. QoS manager 860 may select the identifier based on the QoS parameter or QoS parameter set for the first bearer. QoS manager 860 may determine, based on the identifier, a QoS parameter or QoS parameter set for the first bearer. In some cases, the QoS parameter or QoS parameter set includes a QCI.

BSR manager 865 may configure a BSR to convey the identifier, where the identifier is associated with a virtual radio bearer. BSR manager 865 may configure a BSR to convey an aggregated traffic status from a set of remote wireless devices.

Figure 9:
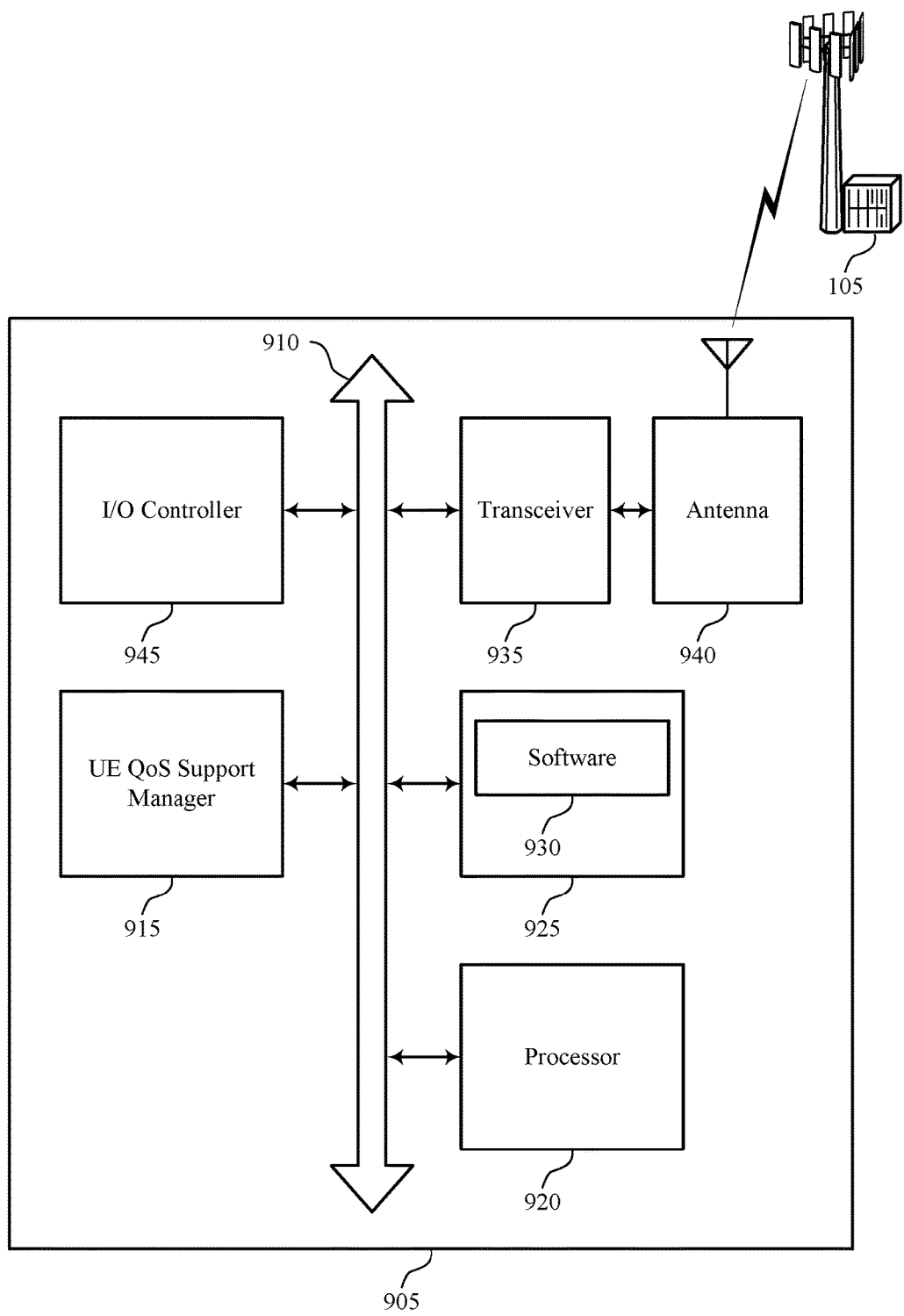
FIG. 9 illustrates a diagram of a system including a UE that supports QoS support for L2 based D2D relay, in accordance with one or more aspects of the present disclosure.

FIG. 9 shows a diagram of a system 900 including a device 905 that supports QoS support for L2 based D2D relay, in accordance with one or more aspects of the present disclosure. Device 905 may be an example of or include the components of wireless device 605, wireless device 705, or a UE 115 as described herein. Device 905 may include components for bi-directional voice and data communications including components for transmitting and receiving communications, including a UE QoS support manager 915, a processor 920, a memory 925, a software 930, a transceiver 935, an antenna 940, and an I/O controller 945. These components may be in electronic communication via one or more busses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting QoS support for L2 based D2D relay).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support QoS support for L2 based D2D relay. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
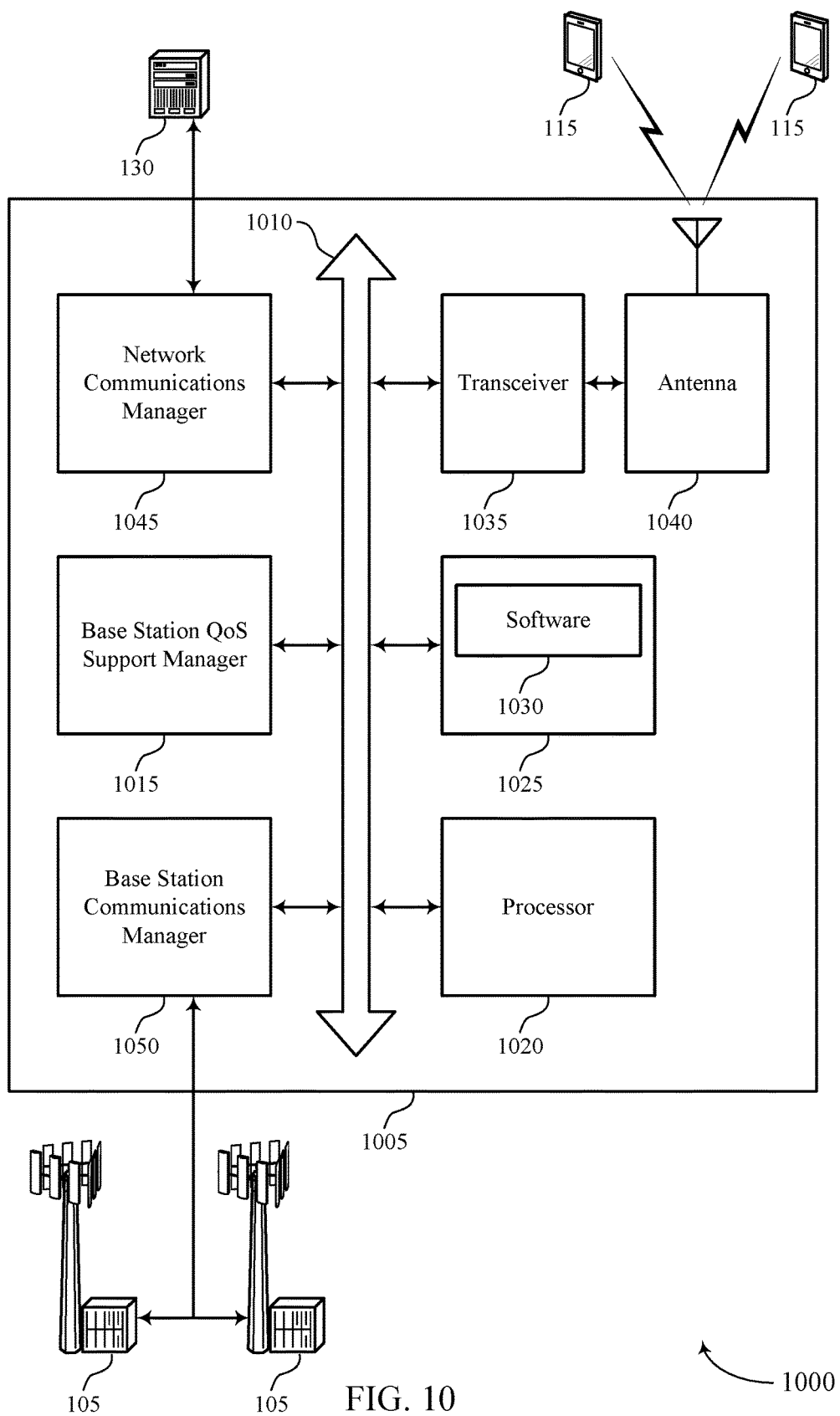
FIG. 10 illustrates a diagram of a system including a base station that supports QoS support for L2 based D2D relay, in accordance with one or more aspects of the present disclosure.

FIG. 10 shows a diagram of a system 1000 including a device 1005 that supports QoS support for L2 based D2D relay, in accordance with one or more aspects of the present disclosure. Device 1005 may be an example of or include the components of wireless device 705, wireless device 805, or a base station 105 as described herein. Device 1005 may include components for bi-directional voice and data communications including components for transmitting and receiving communications, including a base station QoS support manager 1015, a processor 1020, a memory 1025, a software 1030, a transceiver 1035, an antenna 1040, a network communications manager 1045, and a base station communications manager 1050. These components may be in electronic communication via one or more busses (e.g., bus 1010). Device 1005 may communicate wirelessly with one or more UEs 115.

Processor 1020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting QoS support for L2 based D2D relay).

Memory 1025 may include RAM and ROM. The memory 1025 may store computer-readable, computer-executable software 1030 including instructions that, when executed, cause the processor to perform various functions described herein. In some cases, the memory 1025 may contain, among other things, a BIOS which may control basic hardware and/or software operation such as the interaction with peripheral components or devices.

Software 1030 may include code to implement aspects of the present disclosure, including code to support QoS support for L2 based D2D relay. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Base station communications manager 1050 may manage communications with other base station 105, and may include a controller or scheduler for controlling communications with UEs 115 in cooperation with other base stations 105. For example, the base station communications manager 1050 may coordinate scheduling for transmissions to UEs 115 for various interference mitigation techniques such as beamforming or joint transmission. In some examples, base station communications manager 1050 may provide an X2 interface within an LTE/LTE-A wireless communication network technology to provide communication between base stations 105.

Figure 11:
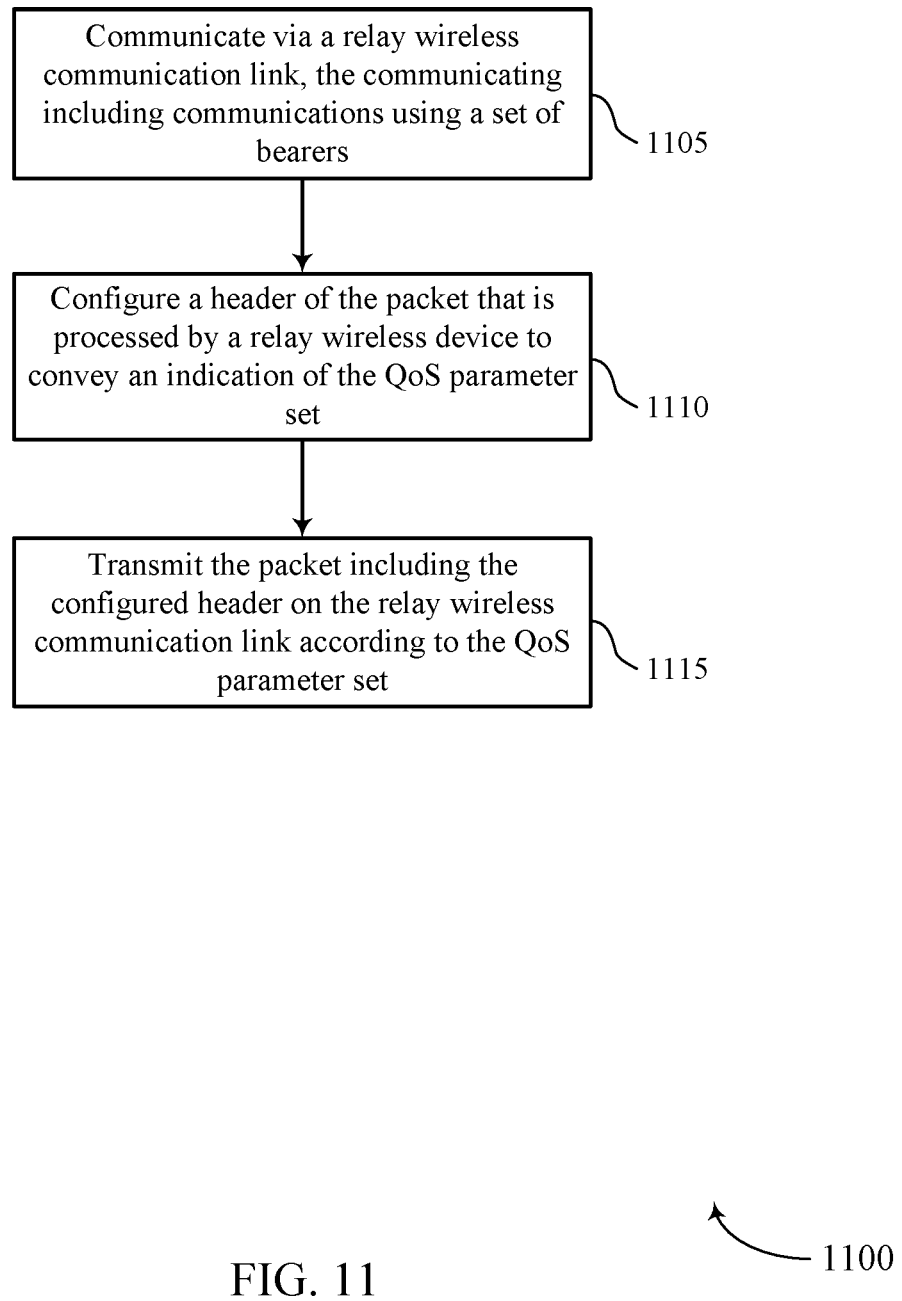
FIGS. 11 through 16 illustrate methods for QoS support for L2 based D2D relay, in accordance with one or more aspects of the present disclosure.

FIG. 11 shows a flowchart illustrating a method 1100 for QoS support for L2 based D2D relay, in accordance with one or more aspects of the present disclosure. The operations of method 1100 may be implemented by a UE 115 or base station 105 or its components as described herein. For example, the operations of method 1100 may be performed by a QoS support manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1105 the UE 115 or base station 105 may communicate via a relay wireless communication link, the communicating comprising communications using a plurality of bearers. The operations of 1105 may be performed according to the methods described with reference to FIGS. 1 through 5. In certain examples, aspects of the operations of 1105 may be performed by a relay link communication manager as described with reference to FIGS. 7 and 8.

At 1110 the UE 115 or base station 105 may configure a header of the packet that is processed by a relay wireless device to convey an indication of the QoS parameter or QoS parameter set. The operations of 1110 may be performed according to the methods described with reference to FIGS. 1 through 5. In certain examples, aspects of the operations of 1110 may be performed by a header configuration manager as described with reference to FIGS. 7 and 8.

At 1115 the UE 115 or base station 105 may transmit the packet comprising the configured header on the relay wireless communication link according to the QoS parameter or QoS parameter set. The operations of 1115 may be performed according to the methods described with reference to FIGS. 1 through 5. In certain examples, aspects of the operations of 1115 may be performed by a relay link communication manager as described with reference to FIGS. 7 through 8.

Figure 12:
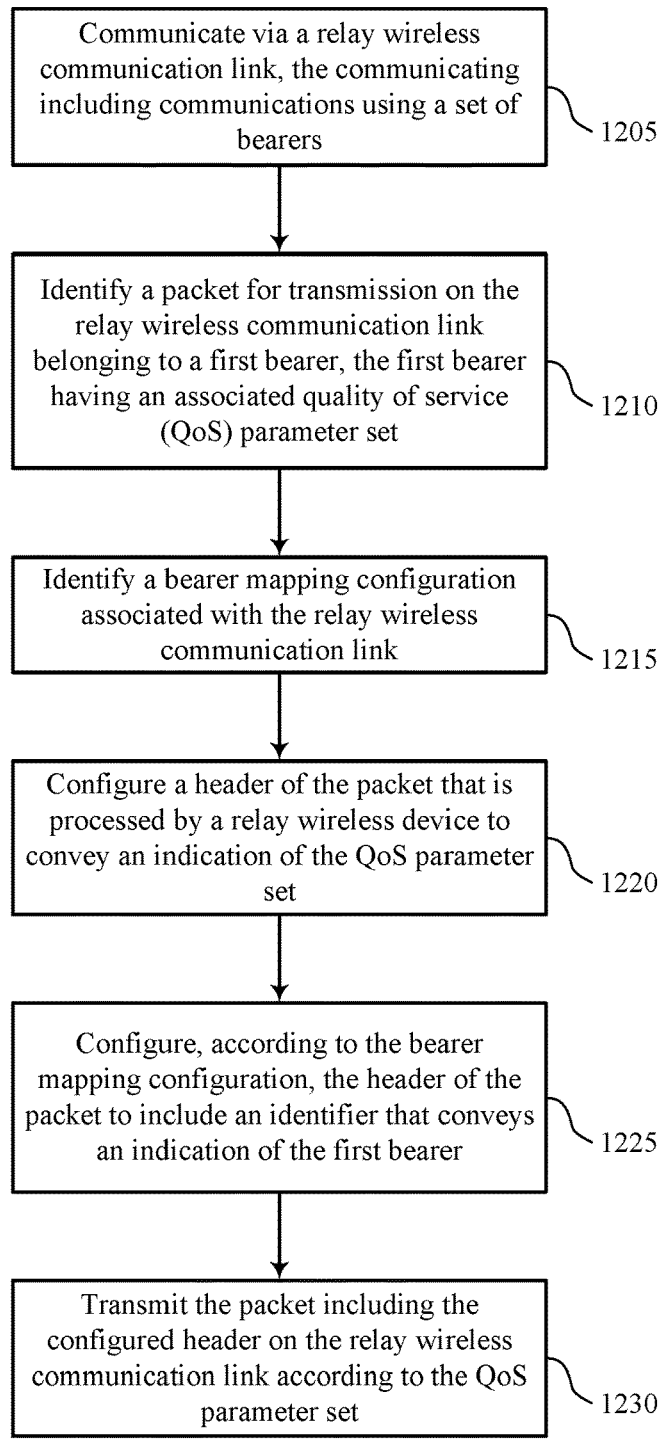

FIG. 12 shows a flowchart illustrating a method 1200 for QoS support for L2 based D2D relay, in accordance with one or more aspects of the present disclosure. The operations of method 1200 may be implemented by a UE 115 or base station 105 or its components as described herein. For example, the operations of method 1200 may be performed by a QoS support manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1205 the UE 115 or base station 105 may communicate via a relay wireless communication link, the communicating comprising communications using a plurality of bearers. The operations of 1205 may be performed according to the methods described with reference to FIGS. 1 through 5. In certain examples, aspects of the operations of 1205 may be performed by a relay link communication manager as described with reference to FIGS. 7 through 8.

At 1210 the UE 115 or base station 105 may identify a packet for transmission on the relay wireless communication link belonging to a first bearer, the first bearer having an associated QoS parameter or QoS parameter set. The operations of 1210 may be performed according to the methods described with reference to FIGS. 1 through 5. In certain examples, aspects of the operations of 1210 may be performed by a packet manager as described with reference to FIGS. 7 through 8.

At 1215 the UE 115 or base station 105 may identify a bearer mapping configuration associated with the relay wireless communication link. The operations of 1215 may be performed according to the methods described with reference to FIGS. 1 through 5. In certain examples, aspects of the operations of 1215 may be performed by a mapping manager as described with reference to FIGS. 7 through 8.

At 1220 the UE 115 or base station 105 may configure a header of the packet that is processed by a relay wireless device to convey an indication of the QoS parameter or QoS parameter set. The operations of 1220 may be performed according to the methods described with reference to FIGS. 1 through 5. In certain examples, aspects of the operations of 1220 may be performed by a header configuration manager as described with reference to FIGS. 7 through 8.

At 1225 the UE 115 or base station 105 may configure, according to the bearer mapping configuration, the header of the packet to include an identifier that conveys an indication of the first bearer. The operations of 1225 may be performed according to the methods described with reference to FIGS. 1 through 5. In certain examples, aspects of the operations of 1225 may be performed by a mapping manager as described with reference to FIGS. 7 through 8.

At 1230 the UE 115 or base station 105 may transmit the packet comprising the configured header on the relay wireless communication link according to the QoS parameter or QoS parameter set. The operations of 1230 may be performed according to the methods described with reference to FIGS. 1 through 5. In certain examples, aspects of the operations of 1230 may be performed by a relay link communication manager as described with reference to FIGS. 7 through 8.

Figure 13:
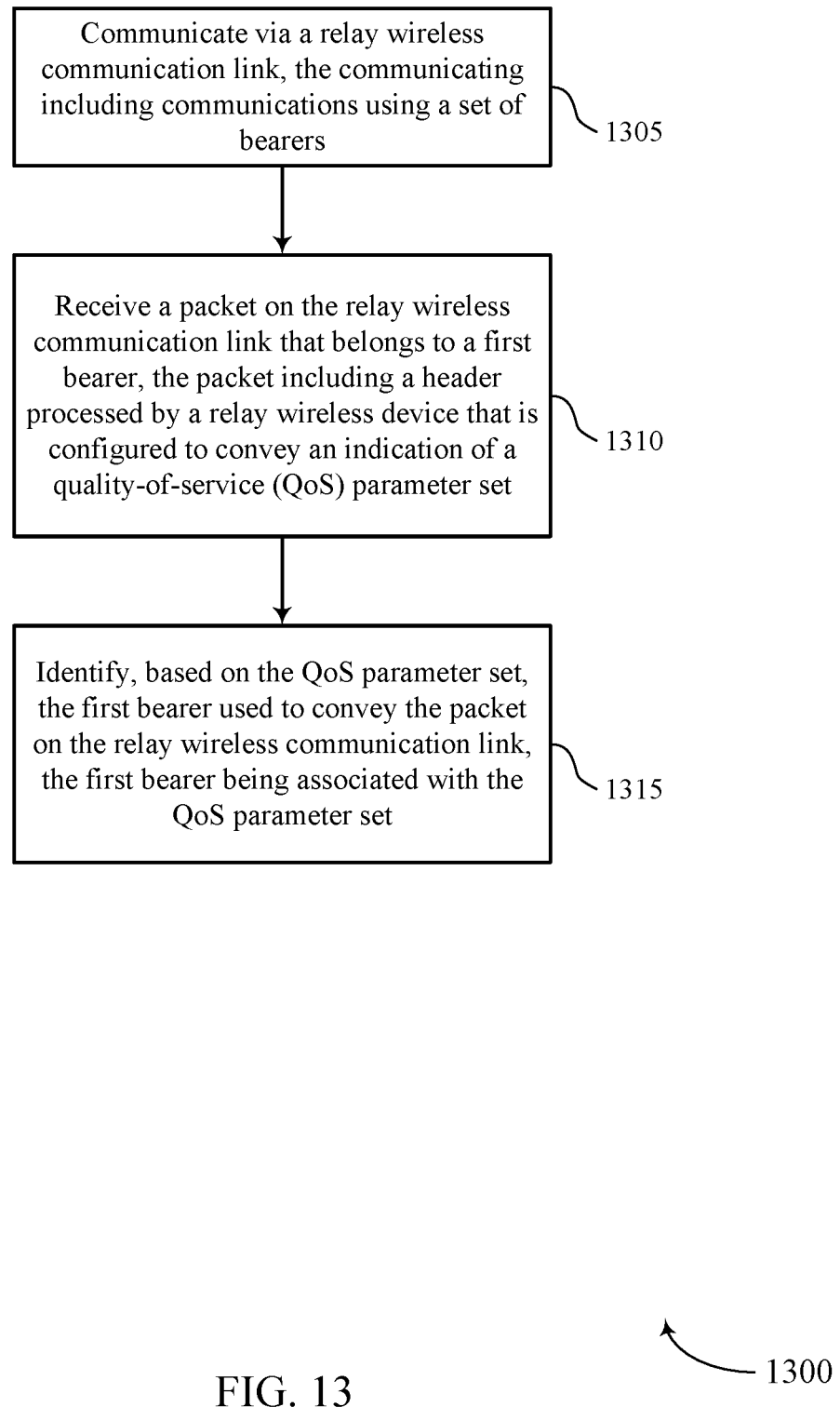

FIG. 13 shows a flowchart illustrating a method 1300 for QoS support for L2 based D2D relay, in accordance with one or more aspects of the present disclosure. The operations of method 1300 may be implemented by a UE 115 or base station 105 or its components as described herein. For example, the operations of method 1300 may be performed by a QoS support manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1305 the UE 115 or base station 105 may communicate via a relay wireless communication link, the communicating comprising communications using a plurality of bearers. The operations of 1305 may be performed according to the methods described with reference to FIGS. 1 through 5. In certain examples, aspects of the operations of 1305 may be performed by a relay link communication manager as described with reference to FIGS. 7 through 8.

At 1310 the UE 115 or base station 105 may receive a packet on the relay wireless communication link belongs to a first bearer, the packet comprising a header processed by a relay wireless device that is configured to convey an indication of a QoS parameter or QoS parameter set. The operations of 1310 may be performed according to the methods described with reference to FIGS. 1 through 5. In certain examples, aspects of the operations of 1310 may be performed by a packet manager as described with reference to FIGS. 7 through 8.

At 1315 the UE 115 or base station 105 may identify, based at least in part on the QoS parameter or QoS parameter set, the first bearer used to convey the packet on the relay wireless communication link, the first bearer being associated with the QoS parameter or QoS parameter set. The operations of 1315 may be performed according to the methods described with reference to FIGS. 1 through 5. In certain examples, aspects of the operations of 1315 may be performed by a header configuration manager as described with reference to FIGS. 7 through 8.

Figure 14:
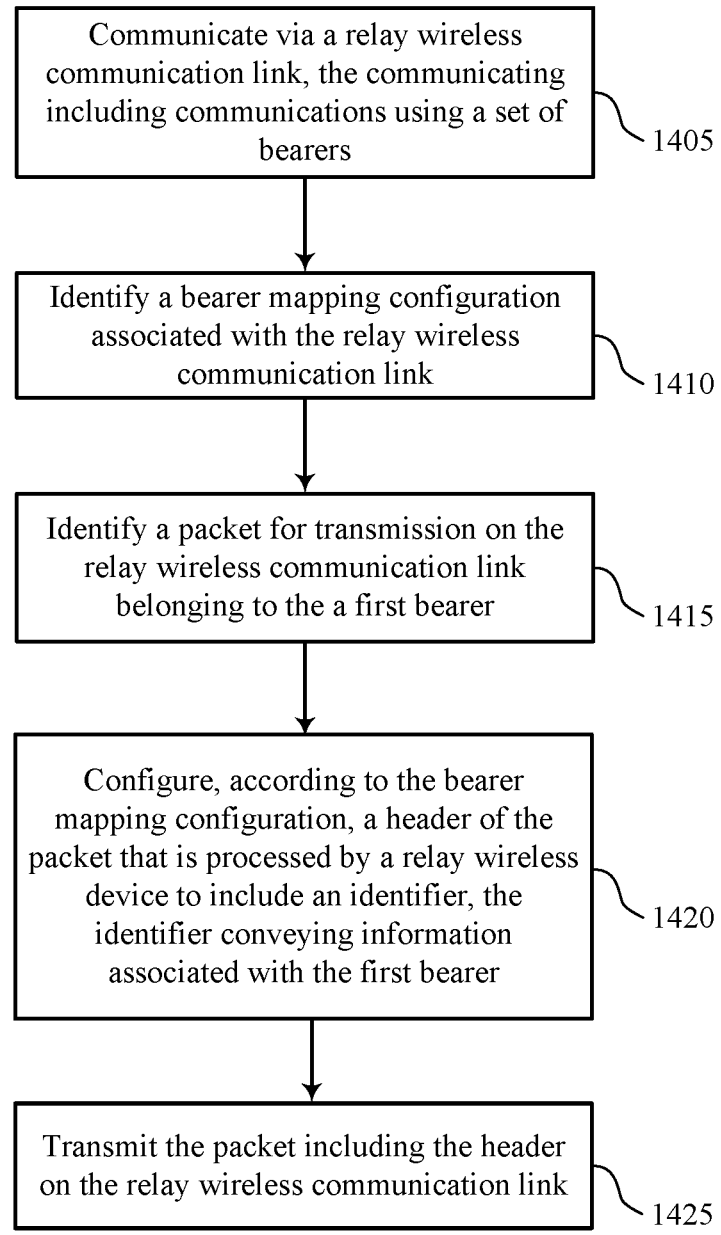

FIG. 14 shows a flowchart illustrating a method 1400 for QoS support for L2 based D2D relay, in accordance with one or more aspects of the present disclosure. The operations of method 1400 may be implemented by a UE 115 or base station 105 or its components as described herein. For example, the operations of method 1400 may be performed by a QoS support manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1405 the UE 115 or base station 105 may communicate via a relay wireless communication link, the communicating comprising communications using a plurality of bearers. The operations of 1405 may be performed according to the methods described with reference to FIGS. 1 through 5. In certain examples, aspects of the operations of 1405 may be performed by a relay link communication manager as described with reference to FIGS. 7 through 8.

At 1410 the UE 115 or base station 105 may identify a bearer mapping configuration associated with the relay wireless communication link. The operations of 1410 may be performed according to the methods described with reference to FIGS. 1 through 5. In certain examples, aspects of the operations of 1410 may be performed by a mapping manager as described with reference to FIGS. 7 through 8.

At 1415 the UE 115 or base station 105 may identify a packet for transmission on the relay wireless communication link belonging to the a first bearer. The operations of 1415 may be performed according to the methods described with reference to FIGS. 1 through 5. In certain examples, aspects of the operations of 1415 may be performed by a packet manager as described with reference to FIGS. 7 through 8.

At 1420, the UE 115 or base station 105 may configure, according to the bearer mapping configuration, a header of the packet that is processed by a relay wireless device to include an identifier, the identifier conveying information associated with the first bearer. The operations of 1420 may be performed according to the methods described with reference to FIGS. 1 through 5. In certain examples, aspects of the operations of 1420 may be performed by a header configuration manager as described with reference to FIGS. 7 through 8.

At 1425 the UE 115 or base station 105 may transmit the packet comprising the header on the relay wireless communication link. The operations of 1425 may be performed according to the methods described with reference to FIGS. 1 through 5. In certain examples, aspects of the operations of 1425 may be performed by a relay link communication manager as described with reference to FIGS. 7 through 8.

Figure 15:
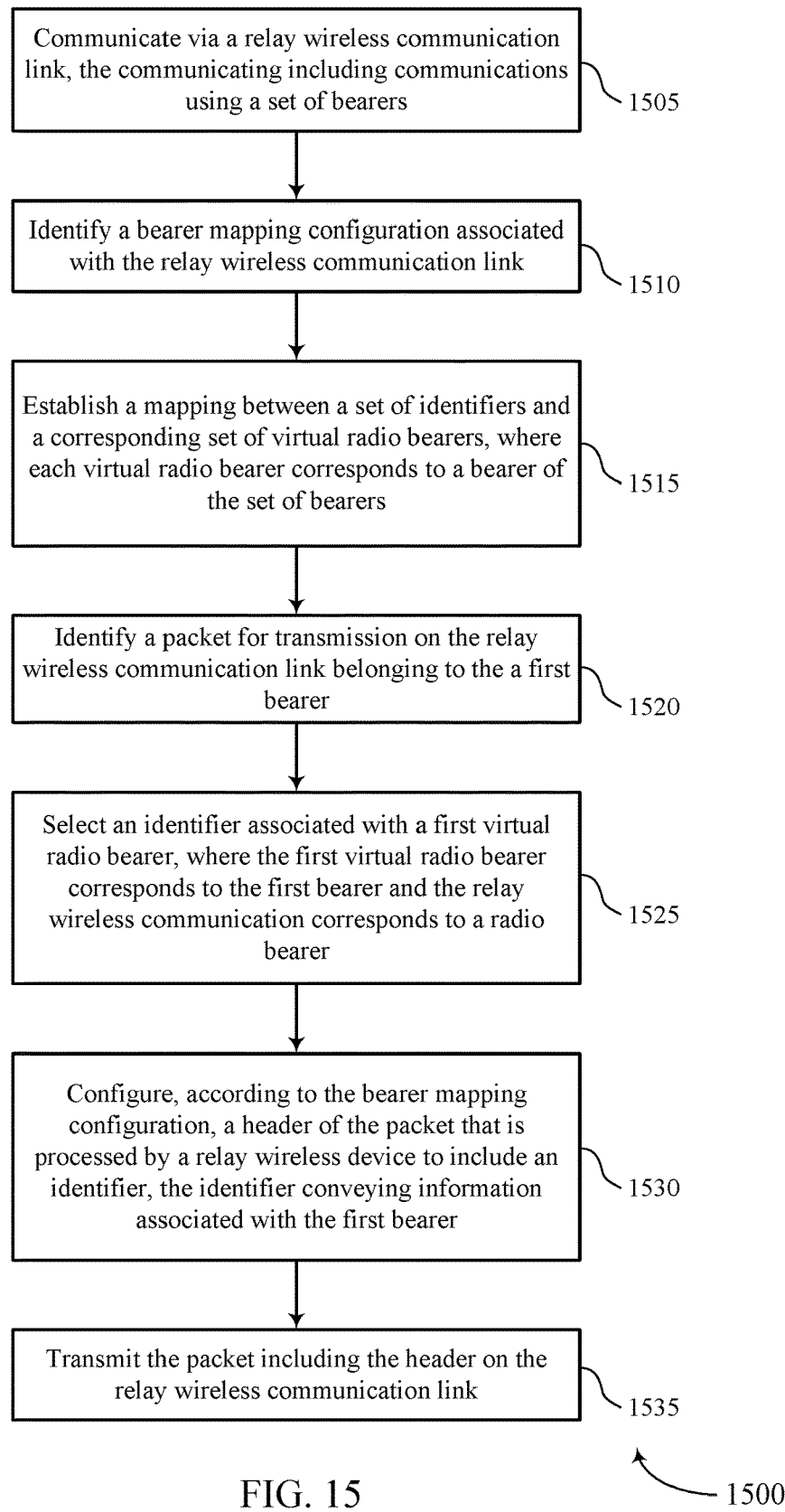

FIG. 15 shows a flowchart illustrating a method 1500 for QoS support for L2 based D2D relay, in accordance with one or more aspects of the present disclosure. The operations of method 1500 may be implemented by a UE 115 or base station 105 or its components as described herein. For example, the operations of method 1500 may be performed by a QoS support manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1505 the UE 115 or base station 105 may communicate via a relay wireless communication link, the communicating comprising communications using a plurality of bearers. The operations of 1505 may be performed according to the methods described with reference to FIGS. 1 through 5. In certain examples, aspects of the operations of 1505 may be performed by a relay link communication manager as described with reference to FIGS. 7 through 8.

At 1510 the UE 115 or base station 105 may identify a bearer mapping configuration associated with the relay wireless communication link. The operations of 1510 may be performed according to the methods described with reference to FIGS. 1 through 5. In certain examples, aspects of the operations of 1510 may be performed by a mapping manager as described with reference to FIGS. 7 through 8.

At 1515 the UE 115 or base station 105 may establish a mapping between a plurality of identifiers and a corresponding plurality of virtual radio bearers, wherein each virtual radio bearer corresponds to a bearer of the plurality of bearers. The operations of 1515 may be performed according to the methods described with reference to FIGS. 1 through 5. In certain examples, aspects of the operations of 1515 may be performed by a mapping manager as described with reference to FIGS. 7 through 8.

At 1520 the UE 115 or base station 105 may identify a packet for transmission on the relay wireless communication link belonging to the a first bearer. The operations of 1520 may be performed according to the methods described with reference to FIGS. 1 through 5. In certain examples, aspects of the operations of 1520 may be performed by a packet manager as described with reference to FIGS. 7 through 8.

At 1525 the UE 115 or base station 105 may select an identifier associated with a first virtual radio bearer, wherein the first virtual radio bearer corresponds to the first bearer and the relay wireless communication corresponds to a radio bearer. The operations of 1525 may be performed according to the methods described with reference to FIGS. 1 through 5. In certain examples, aspects of the operations of 1525 may be performed by an identification manager as described with reference to FIGS. 7 through 8.

At 1530 the UE 115 or base station 105 may configure, according to the bearer mapping configuration, a header of the packet that is processed by a relay wireless device to include an identifier, the identifier conveying information associated with the first bearer. The operations of 1530 may be performed according to the methods described with reference to FIGS. 1 through 5. In certain examples, aspects of the operations of 1530 may be performed by a header configuration manager as described with reference to FIGS. 7 through 8.

At 1535 the UE 115 or base station 105 may transmit the packet comprising the header on the relay wireless communication link. The operations of 1535 may be performed according to the methods described with reference to FIGS. 1 through 5. In certain examples, aspects of the operations of 1535 may be performed by a relay link communication manager as described with reference to FIGS. 7 through 8.

Figure 16:
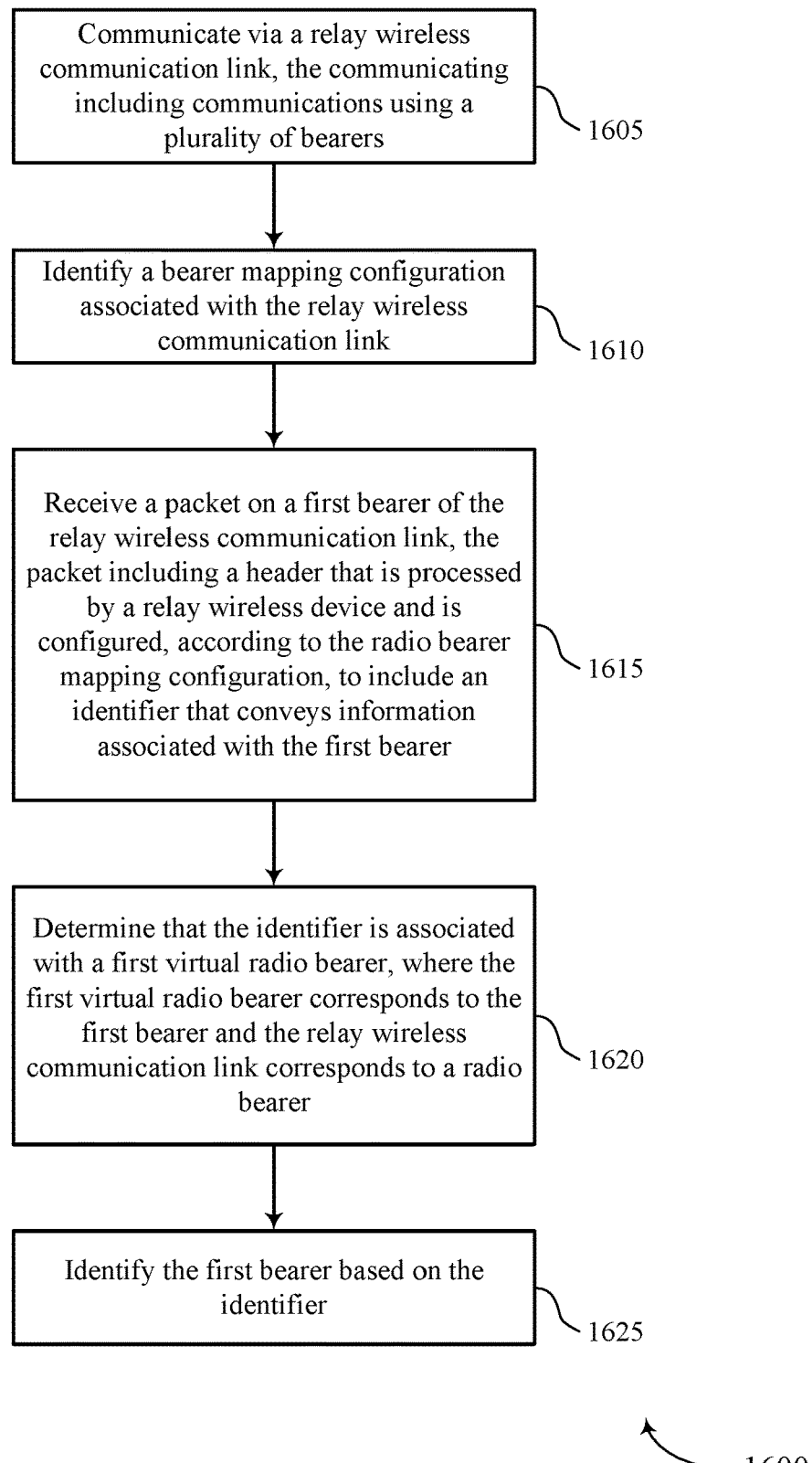

FIG. 16 shows a flowchart illustrating a method 1600 for QoS support for L2 based D2D relay in accordance with various aspects of the present disclosure. The operations of method 1600 may be implemented by a UE 115 or base station 105 or its components as described herein. For example, the operations of method 1600 may be performed by a QoS support manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1605 the UE 115 or base station 105 may communicate via a relay wireless communication link, the communicating comprising communications using a plurality of bearers. The operations of 1605 may be performed according to the methods described with reference to FIGS. 1 through 5. In certain examples, aspects of the operations of 1605 may be performed by a relay link communication manager as described with reference to FIGS. 7 through 8.

At 1610 the UE 115 or base station 105 may identify a bearer mapping configuration associated with the relay wireless communication link. The operations of 1610 may be performed according to the methods described with reference to FIGS. 1 through 5. In certain examples, aspects of the operations of 1610 may be performed by a mapping manager as described with reference to FIGS. 7 through 8.

At 1615 the UE 115 or base station 105 may receive a packet on a first bearer of the relay wireless communication link, the packet comprising a header that is processed by a relay wireless device and is configured, according to the radio bearer mapping configuration, to include an identifier that conveys information associated with the first bearer. The operations of 1615 may be performed according to the methods described with reference to FIGS. 1 through 5. In certain examples, aspects of the operations of 1615 may be performed by a packet manager as described with reference to FIGS. 7 through 8.

At 1620 the UE 115 or base station 105 may determine that the identifier is associated with a first virtual radio bearer, wherein the first virtual radio bearer corresponds to the first bearer and the relay wireless communication link corresponds to a radio bearer. The operations of 1620 may be performed according to the methods described with reference to FIGS. 1 through 5. In certain examples, aspects of the operations of 1620 may be performed by an identification manager as described with reference to FIGS. 7 through 8.

At 1625 the UE 115 or base station 105 may identify the first bearer based at least in part on the identifier. The operations of 1625 may be performed according to the methods described with reference to FIGS. 1 through 5. In certain examples, aspects of the operations of 1625 may be performed by an identification manager as described with reference to FIGS. 7 through 8.

In some examples, aspects from two or more of the methods 1100, 1200, 1300, 1400, 1500 and 1600 described with reference to FIGS. 11-16 may be combined. It should be noted that the methods 1100, 1200, 1300, 1400, 1500 and 1600 are just example implementations, and that the operations of the methods 1100, 1200, 1300, 1400, 1500 and 1600 may be rearranged or otherwise modified such that other implementations are possible.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of Universal Mobile Telecommunications System (UMTS) that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term eNB may be generally used to describe the base stations. The wireless communications system or systems described herein may include a heterogeneous LTE/LTE-A or NR network in which different types of eNBs provide coverage for various geographical regions. For example, each eNB, gNB, or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication systems 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C). Also, as used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
communicating via a relay wireless communication link, the communicating comprising communications using a plurality of bearers;
configuring a layer 2 header of a packet for transmission on the relay wireless communication link that is processed by a relay wireless device to convey an indication of a quality of service (QoS) parameter set;
identifying that the packet belongs to a first bearer, the first bearer being associated with the QoS parameter set, wherein the layer 2 header is further configured to convey an indication of an allocation and retention policy (ARP) of the first bearer; and
transmitting the packet comprising the configured layer 2 header on the relay wireless communication link according to the QoS parameter set.

2. The method of claim 1, further comprising:
identifying a bearer mapping configuration associated with the relay wireless communication link; and
configuring, according to the bearer mapping configuration, the layer 2 header of the packet to include an identifier that conveys an indication of the first bearer.

3. The method of claim 1, further comprising:
configuring the relay wireless device with a mapping of the QoS parameter set indication and a proximity-based service (ProSe) per-packet priority (PPPP) indicator of the first bearer.

4. The method of claim 1, wherein:
the layer 2 header comprises one of an adaptation header or a packet data convergence protocol (PDCP) header.

5. The method of claim 1, further comprising:
aggregating two or more bearers into a relay bearer; and
selecting at least one of the QoS parameter set associated with the first bearer or a bitrate parameter to apply to the relay bearer.

6. The method of claim 5, wherein:
the bitrate parameter comprises one of an aggregate maximum bitrate (AMBR), maximum bitrate (MBR) or a guaranteed bitrate (GBR).

7. The method of claim 1, further comprising:
configuring the layer 2 header to include the indication of the QoS parameter set and a proximity-based service (ProSe) per-packet priority (PPPP) indicator of the first bearer.

8. The method of claim 1, wherein the relay wireless communication link comprises one of an uplink connection or a downlink connection using at least one of a Uu radio interface between a base station and the relay wireless device or a PC5 radio interface between the relay wireless device and a remote wireless device.

9. The method of claim 1, wherein:
the QoS parameter set comprises a QoS class identifier (QCI).

10. The method of claim 1, further comprising:
determining the ARP parameter associated with the packet of the first bearer; and
determining the transmission of the packet according to the determined ARP parameter included in the layer 2 header.

11. A method for wireless communication, comprising:
communicating via a relay wireless communication link, the communicating comprising communications using a plurality of bearers;
receiving, on the relay wireless communication link, a packet comprising a layer 2 header processed by a relay wireless device that is configured to convey an indication of a quality of service (QoS) parameter set;
identifying, based at least in part on the QoS parameter set, a first bearer used to convey the packet on the relay wireless communication link, the first bearer being associated with the QoS parameter set; and
identifying the first bearer based at least in part on the QoS parameter set indication and an allocation and retention policy (ARP) indicator of the first bearer.

12. The method of claim 11, further comprising:
identifying the first bearer based at least in part on the QoS parameter set indication and a proximity-based service (ProSe) per-packet priority (PPPP) indicator of the first bearer.

13. The method of claim 11, further comprising:
identifying, during a connection establishment procedure, a mapping between the QoS parameter set and a plurality of radio bearers of the relay wireless communication link.

14. The method of claim 13, wherein:
the mapping is identified according to a radio resource control (RRC) configuration message exchanged during the connection establishment procedure.

15. A method for wireless communication, comprising:
communicating via a relay wireless communication link, the communicating comprising communications using a plurality of bearers;
identifying a bearer mapping configuration associated with the relay wireless communication link;
identifying a packet for transmission on the relay wireless communication link belonging to a first bearer, the first bearer being associated with a quality of service (QoS) parameter set;
configuring, according to the bearer mapping configuration, a layer 2 header of the packet that is processed by a relay wireless device to include an identifier, the identifier conveying information associated with the first bearer;
configuring the layer 2 header to include the indication of the QoS parameter set and an allocation and retention policy (ARP) indicator of the first bearer; and
transmitting the packet comprising the layer 2 header on the relay wireless communication link.

16. The method of claim 15, further comprising:
selecting an identifier associated with a first virtual radio bearer, wherein the first virtual radio bearer corresponds to the first bearer and the relay wireless communication corresponds to a radio bearer.

17. The method of claim 16, further comprising:
Identifying the QOS parameter set for the first bearer; and
selecting the identifier based at least in part on the QoS parameter set for the first bearer.

18. The method of claim 17, wherein:
the QoS parameter set comprises a QoS class identifier (QCI).

19. The method of claim 16, further comprising:
configuring a buffer status report (BSR) to convey the identifier associated with the first virtual radio bearer or an aggregated traffic status from a plurality of remote wireless devices, or both.

20. The method of claim 15, wherein:
the relay wireless communication link comprises one of an uplink or a downlink connection using at least one of a PC5 radio interface between the relay wireless device and a remote wireless device or a Uu radio interface between a base station and the relay wireless device.

21. The method of claim 15, wherein:
the layer 2 header comprises one of an adaptation header or a packet data convergence protocol (PDCP) header.

22. A method for wireless communication, comprising:
communicating via a relay wireless communication link, the communicating comprising communications using a plurality of bearers;
identifying a bearer mapping configuration associated with the relay wireless communication link;
receiving a packet on a first bearer of the relay wireless communication link, the packet comprising a layer 2 header that is processed by a relay wireless device and is configured, according to the bearer mapping configuration, to include an identifier that conveys information associated with the first bearer, the first bearer being associated with a quality of service (QoS) parameter set;
identifying the first bearer based at least in part on the identifier; and
configuring the layer 2 header to include the indication of the QoS parameter set and an allocation and retention policy (ARP) indicator of the first bearer.

23. The method of claim 22, further comprising:
determining that the identifier is associated with a first virtual radio bearer, wherein the first virtual radio bearer corresponds to the first bearer and the relay wireless communication link corresponds to a radio bearer.

24. The method of claim 22, further comprising:
establishing a mapping between a plurality of identifiers and a corresponding plurality of virtual radio bearers, wherein each virtual radio bearer corresponds to a bearer of the plurality of bearers.

25. The method of claim 24, wherein:
each bearer of the plurality of bearers comprises an associated QOS parameter set.

26. The method of claim 24, wherein:
the mapping is established during a connection establishment procedure and is exchanged using a radio resource control (RRC) configuration message.

27. The method of claim 22, further comprising:
determining that the layer 2 header includes a plurality of identifiers, each identifier conveying information associated with a corresponding bearer; and
identifying the first bearer from among the plurality of identifiers.

28. The method of claim 22, further comprising:
determining, based at least in part on the identifier, a quality of service (QoS) parameter set for the first bearer.

* * * * *